(12) United States Patent
Elshafie et al.

(10) Patent No.: US 12,238,562 B2
(45) Date of Patent: Feb. 25, 2025

(54) REPORTING OF PUNCTURING BASED INTERFERENCE PLUS NOISE COVARIANCE MATRIX MEASUREMENTS

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Abdelrahman Mohamed Ahmed Mohamed Ibrahim, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 17/808,021

(22) Filed: Jun. 21, 2022

(65) Prior Publication Data

US 2023/0413090 A1    Dec. 21, 2023

(51) Int. Cl.
*H04W 24/00*     (2009.01)
*H04B 17/345*    (2015.01)
*H04W 24/10*     (2009.01)

(52) U.S. Cl.
CPC .......... *H04W 24/10* (2013.01); *H04B 17/345* (2015.01)

(58) Field of Classification Search
CPC ..... H04B 17/345; H04L 1/0069; H04L 5/005; H04L 5/0051; H04L 5/0057; H04W 24/10
See application file for complete search history.

(56) References Cited

U.S. PATENT DOCUMENTS

| | | | |
|---|---|---|---|
| 10,790,892 B2* | 9/2020 | Manolakos | H04L 5/0094 |
| 2014/0233407 A1* | 8/2014 | Pourahmadi | H04L 5/0073 370/252 |
| 2023/0308231 A1* | 9/2023 | Dutta | H04B 17/345 |
| 2023/0370890 A1* | 11/2023 | Abdelghaffar | H04W 28/0268 |
| 2023/0371024 A1* | 11/2023 | Elshafie | H04W 24/10 |

* cited by examiner

*Primary Examiner* — Frank Duong
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, a measurement configuration indicating one or more punctured resources of a physical downlink shared channel (PDSCH) that can be used for measurements associated with estimating an interference plus noise covariance (INC) matrix at the UE. The UE may receive, from the network node, a reporting configuration indicating one or more INC matrices at the UE to be reported. The UE may transmit, to the network node, a report indicating the one or more INC matrices at the UE based at least in part on receiving the reporting configuration. Numerous other aspects are provided.

30 Claims, 11 Drawing Sheets

REPORTING OF PUNCTURING BASED INTERFERENCE PLUS NOISE COVARIANCE MATRIX MEASUREMENTS

FIELD OF THE DISCLOSURE

Aspects of the present disclosure generally relate to wireless communication and to techniques and apparatuses for reporting of puncturing based interference plus noise covariance (INC) matrix measurements.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a network node, a measurement configuration indicating one or more punctured resources of a physical downlink shared channel (PDSCH) that can be used for measurements associated with estimating an interference plus noise covariance (INC) matrix at the UE; receiving, from the network node, a reporting configuration indicating one or more INC matrices at the UE to be reported; and transmitting, to the network node, a report indicating the one or more INC matrices at the UE based at least in part on receiving the reporting configuration.

In some aspects, a method of wireless communication performed by a network node includes transmitting a measurement configuration intended for a UE indicating one or more punctured resources of a PDSCH that can be used for measurements by the UE associated with estimating an INC matrix at the UE; transmitting a reporting configuration intended for the UE indicating one or more INC matrices at the UE to be reported by the UE; and receiving a report associated with the UE indicating the one or more INC matrices at the UE based at least in part on transmitting the reporting configuration.

In some aspects, a UE for wireless communication includes a memory and one or more processors coupled to the memory. The one or more processors may be configured to: receive, from a network node, a measurement configuration indicating one or more punctured resources of a PDSCH that can be used for measurements associated with estimating an INC matrix at the UE; receive, from the network node, a reporting configuration indicating one or more INC matrices at the UE to be reported; and transmit, to the network node, a report indicating the one or more INC matrices at the UE based at least in part on receiving the reporting configuration.

In some aspects, a network node for wireless communication includes a memory and one or more processors coupled to the memory. The one or more processors may be configured to: transmit a measurement configuration intended for a UE indicating one or more punctured resources of a PDSCH that can be used for measurements by the UE associated with estimating an INC matrix at the UE; transmit a reporting configuration intended for the UE indicating one or more INC matrices at the UE to be reported by the UE; and receive a report associated with the UE indicating the one or more INC matrices at the UE based at least in part on transmitting the reporting configuration.

In some aspects, a non-transitory computer-readable medium storing a set of instructions for wireless communication includes one or more instructions that, when executed by one or more processors of a UE, cause the UE to: receive, from a network node, a measurement configuration indicating one or more punctured resources of a PDSCH that can be used for measurements associated with estimating an INC matrix at the UE; receive, from the network node, a reporting configuration indicating one or more INC matrices at the UE to be reported; and transmit, to the network node, a report indicating the one or more INC matrices at the UE based at least in part on receiving the reporting configuration.

In some aspects, a non-transitory computer-readable medium storing a set of instructions for wireless communication includes one or more instructions that, when executed by one or more processors of a network node, cause the network node to: transmit a measurement configuration intended for a UE indicating one or more punctured resources of a PDSCH that can be used for measurements by the UE associated with estimating an INC matrix at the UE; transmit a reporting configuration intended for the UE indicating one or more INC matrices at the UE to be reported by the UE; and receive a report associated with the UE indicating the one or more INC matrices at the UE based at least in part on transmitting the reporting configuration.

In some aspects, an apparatus for wireless communication includes means for receiving, from a network node, a measurement configuration indicating one or more punctured resources of a PDSCH that can be used for measurements associated with estimating an INC matrix at the apparatus; means for receiving, from the network node, a reporting configuration indicating one or more INC matrices at the apparatus to be reported; and means for transmitting, to the network node, a report indicating the one or more INC matrices at the apparatus based at least in part on receiving the reporting configuration.

In some aspects, an apparatus for wireless communication includes means for transmitting a measurement configuration intended for a UE indicating one or more punctured resources of a PDSCH that can be used for measurements by the UE associated with estimating an INC matrix at the UE; means for transmitting a reporting configuration intended for the UE indicating one or more INC matrices at the UE to be reported by the UE; and means for receiving a report associated with the UE indicating the one or more INC matrices at the UE based at least in part on transmitting the reporting configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
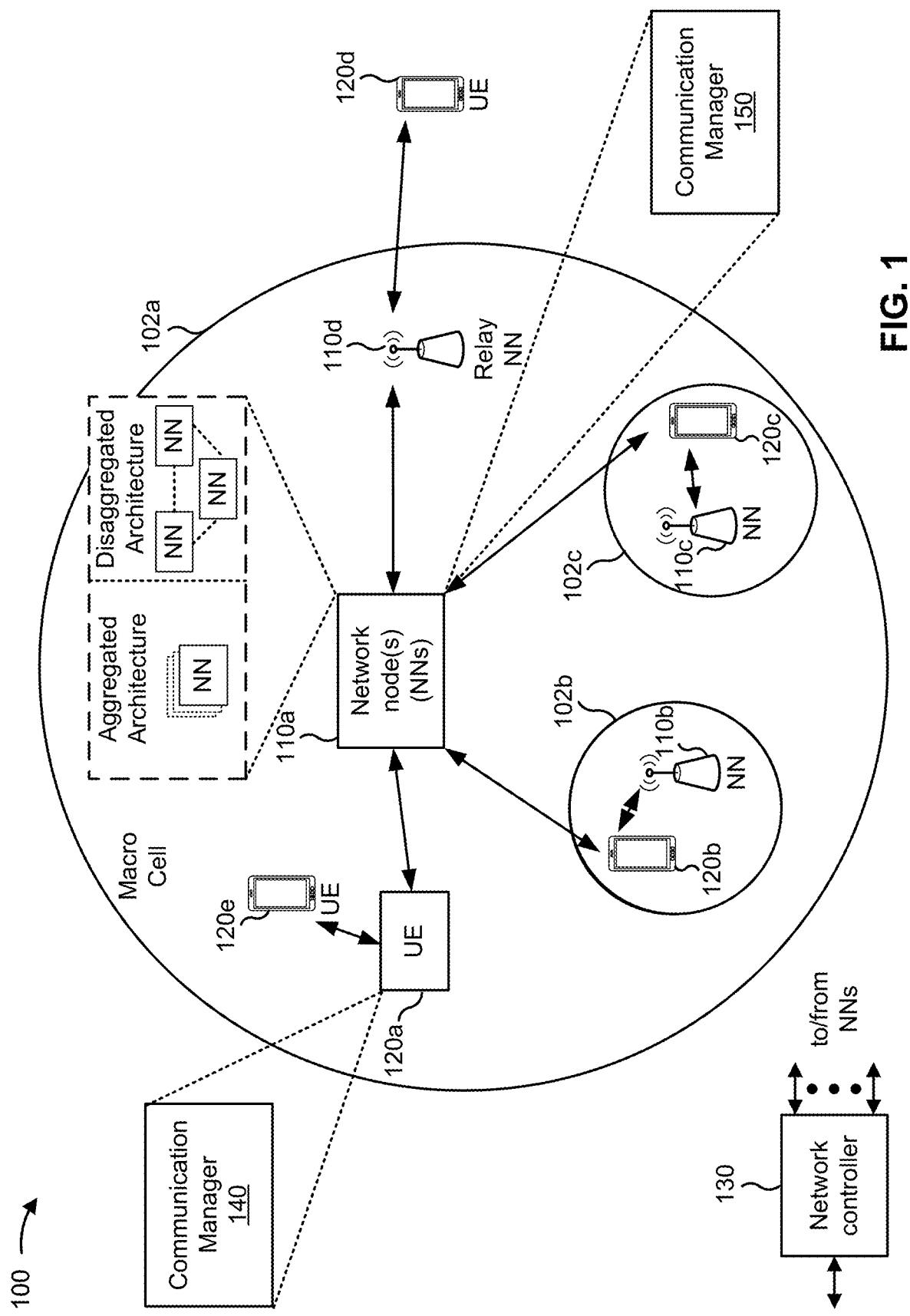
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) MC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, a measurement configuration indicating one or more punctured resources of a physical downlink shared channel (PDSCH) that can be used for measurements associated with estimating an interference plus noise covariance (INC) matrix at the UE; receive, from the network node, a reporting configuration indicating one or more INC matrices at the UE to be reported; and/or transmit, to the network node, a report indicating the one or more INC matrices at the UE based at least in part on receiving the reporting configuration. Additionally, or alternatively, the communication manager 140 may perform one or more other operations described herein.

In some aspects, the network node 110 may include a communication manager 150. As described in more detail elsewhere herein, the communication manager 150 may transmit a measurement configuration intended for a UE indicating one or more punctured resources of a PDSCH that can be used for measurements by the UE associated with estimating an INC matrix at the UE; transmit a reporting configuration intended for the UE indicating one or more INC matrices at the UE to be reported by the UE; and/or receive a report associated with the UE indicating the one or more INC matrices at the UE based at least in part on transmitting the reporting configuration. Additionally, or alternatively, the communication manager 150 may perform one or more other operations described herein.

As indicated above, FIG. 1 is provided as an example. Other examples may differ from what is described with regard to FIG. 1.

Figure 2:
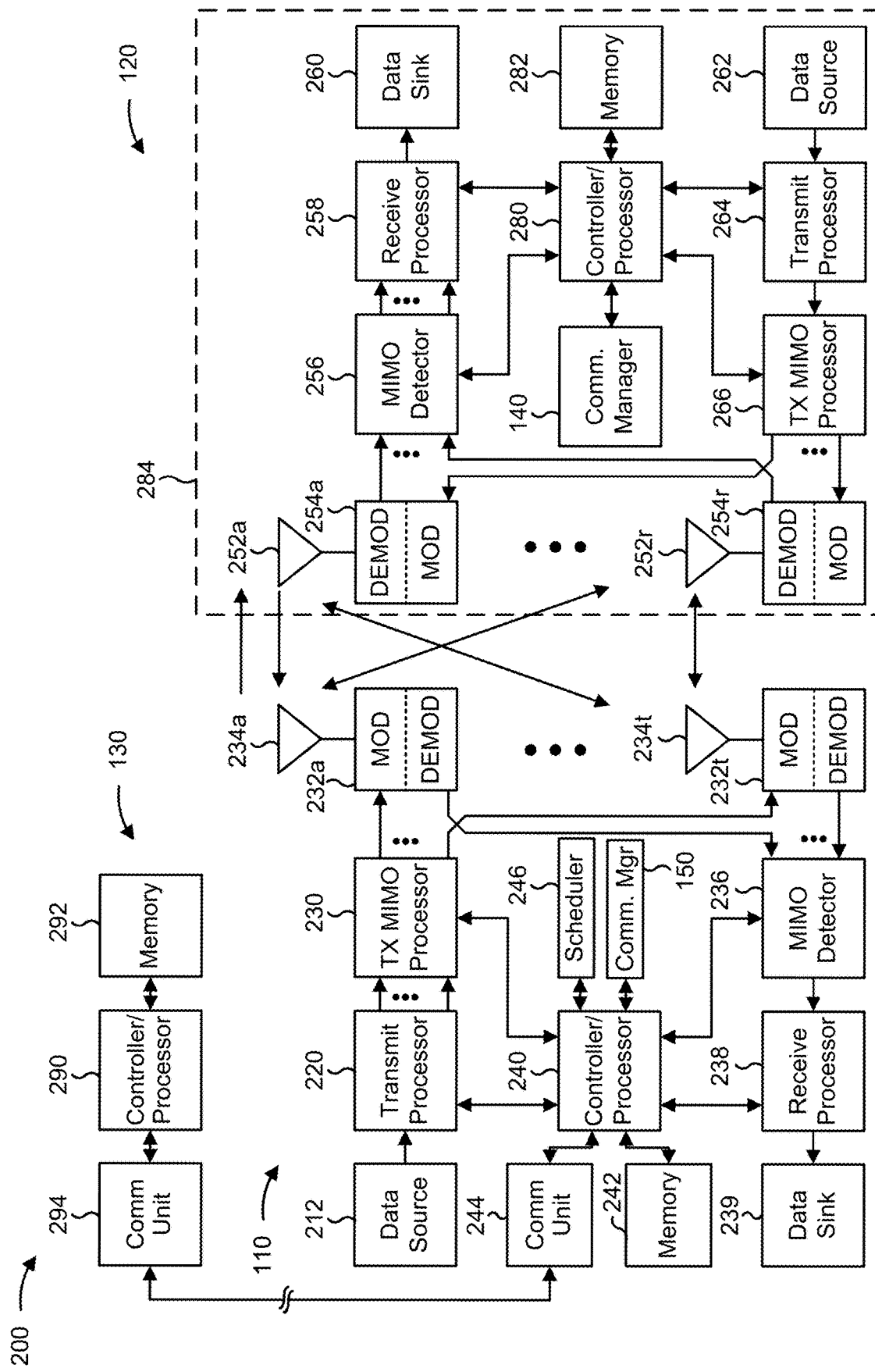
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the network node 110, the controller/processor 280 of the UE 120, and/or any other component(s) of FIG. 2 may perform one or more techniques associated with reporting of puncturing based interference plus noise covariance (INC) matrix measurements, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network node, a measurement configuration indicating one or more punctured resources of a physical downlink shared channel (PDSCH) that can be used for measurements associated with estimating an interference plus noise covariance (INC) matrix at the UE (e.g., using communication manager 140, antenna 252, DEMOD 254, MIMO detector 256, receive processor 258, controller/processor 280, memory 282, and/or the like); means for receiving, from the network node, a reporting configuration indicating one or more INC matrices at the UE to be reported (e.g., using communication manager 140, antenna 252, DEMOD 254, MIMO detector 256, receive processor 258, controller/processor 280, memory 282, and/or the like); and/or means for transmitting, to the network node, a report indicating the one or more INC matrices at the UE based at least in part on receiving the reporting configuration (e.g., using communication manager 140, controller/processor 280, transmit processor 264, TX MIMO processor 266, MOD 254, antenna 252, memory 282, and/or the like). The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for measuring the PDSCH using the one or more punctured resources to estimate the one or more INC matrices at the UE (e.g., using communication manager 140, antenna 252, DEMOD 254, MIMO detector 256, receive processor 258, controller/processor 280, memory 282, and/or the like).

In some aspects, the UE 120 includes means for receiving, from the network node, an indication of one or more resource puncturing patterns associated with the PDSCH (e.g., using communication manager 140, antenna 252, DEMOD 254, MIMO detector 256, receive processor 258, controller/processor 280, memory 282, and/or the like). In some aspects, the UE 120 includes means for receiving, from the network node, downlink control information (DCI) activating one or more resource puncturing patterns associated with the PDSCH (e.g., using communication manager 140, antenna 252, DEMOD 254, MIMO detector 256, receive processor 258, controller/processor 280, memory 282, and/or the like).

In some aspects, the UE 120 includes means for receiving, from the network node, an indication of an amount of time or a number of instances in which an activated puncturing pattern associated with the PDSCH is to remain active (e.g., using communication manager 140, antenna 252, DEMOD 254, MIMO detector 256, receive processor 258, controller/processor 280, memory 282, and/or the like).

In some aspects, the UE 120 includes means for receiving, from the network node, an indication that the UE is to report INC matrices for at least one of: one or more physical resource blocks (PRBs) of the PDSCH, one or more PRB groups (PRGs) of the PDSCH, one or more subbands of the PDSCH, or a wideband across all PRBs of the PDSCH (e.g., using communication manager 140, antenna 252, DEMOD 254, MIMO detector 256, receive processor 258, controller/processor 280, memory 282, and/or the like).

In some aspects, the UE 120 includes means for transmitting, for an INC matrix of the one or more INC matrices, a subset of elements of the INC matrix from a set of elements of the INC matrix (e.g., using communication manager 140, controller/processor 280, transmit processor 264, TX MIMO processor 266, MOD 254, antenna 252, memory 282, and/or the like). In some aspects, the UE 120 includes means for transmitting, to the network node, the report using uplink resources associated with acknowledgement or negative acknowledgement feedback associated with the PDSCH (e.g., using communication manager 140, controller/processor 280, transmit processor 264, TX MIMO processor 266, MOD 254, antenna 252, memory 282, and/or the like).

In some aspects, the UE 120 includes means for receiving, from the network node, an indication of uplink resources to be used to transmit the report (e.g., using communication manager 140, antenna 252, DEMOD 254, MIMO detector 256, receive processor 258, controller/processor 280, memory 282, and/or the like); and/or means for transmitting, to the network node, the report using the uplink resources (e.g., using communication manager 140, controller/processor 280, transmit processor 264, TX MIMO processor 266, MOD 254, antenna 252, memory 282, and/or the like).

In some aspects, the UE 120 includes means for transmitting, to the network node, the report and acknowledgement or negative acknowledgement feedback associated with the PDSCH in a two-stage uplink control information communication (e.g., using communication manager 140, controller/processor 280, transmit processor 264, TX MIMO processor 266, MOD 254, antenna 252, memory 282, and/or the like).

In some aspects, the UE 120 includes means for transmitting, to the network node, the report indicating: elements of an INC matrix of the one or more INC matrices, and elements of the remaining INC matrices, of the one or more INC matrices, as differential elements relative to corresponding elements of the INC matrix (e.g., using communication manager 140, controller/processor 280, transmit processor 264, TX MIMO processor 266, MOD 254, antenna 252, memory 282, and/or the like). In some aspects, the UE 120 includes means for transmitting, to the network node, the report indicating an INC matrix, of the one or more INC matrices, that includes a set of elements, wherein the report indicates: a first subset of elements of the set of elements, and a second subset of elements, of the set of elements, as differential elements relative to corresponding elements of the first subset of elements (e.g., using communication manager 140, controller/processor 280, transmit processor 264, TX MIMO processor 266, MOD 254, antenna 252, memory 282, and/or the like).

In some aspects, the UE 120 includes means for transmitting, to the network node, the report indicating an INC matrix, of the one or more INC matrices, that includes a set of elements quantized to a quantization level (e.g., using communication manager 140, controller/processor 280, transmit processor 264, TX MIMO processor 266, MOD 254, antenna 252, memory 282, and/or the like).

In some aspects, the UE 120 includes means for transmitting, to the network node, the report indicating: an INC matrix, of the one or more INC matrices, that includes a set of elements quantized to a first quantization level, and remaining INC matrices, of the one or more INC matrices, that each include a set of elements quantized to a second quantization level (e.g., using communication manager 140, controller/processor 280, transmit processor 264, TX MIMO processor 266, MOD 254, antenna 252, memory 282, and/or the like).

In some aspects, the UE 120 includes means for transmitting, to the network node, the report indicating: an INC matrix, of the one or more INC matrices, that includes a set of elements quantized to a first quantization level, and remaining INC matrices, of the one or more INC matrices, that each include a set of elements as differential elements relative to corresponding elements of the set of elements of the INC matrix, the differential elements quantized to a second quantization level (e.g., using communication manager 140, controller/processor 280, transmit processor 264, TX MIMO processor 266, MOD 254, antenna 252, memory 282, and/or the like).

In some aspects, the UE 120 includes means for transmitting, to the network node, the report indicating: an INC matrix, of the one or more INC matrices, that is a fully reported INC matrix, and remaining INC matrices, of the one or more INC matrices, that are partially reported INC matrices (e.g., using communication manager 140, controller/processor 280, transmit processor 264, TX MIMO processor 266, MOD 254, antenna 252, memory 282, and/or the like).

In some aspects, the UE 120 includes means for receiving, from the network node, downlink control information triggering the UE to transmit one or more reports indicating one or more INC matrices (e.g., using communication manager 140, antenna 252, DEMOD 254, MIMO detector 256, receive processor 258, controller/processor 280, memory 282, and/or the like).

In some aspects, the UE 120 includes means for receiving, from the network node, an indication of a first number of instances in which an activated puncturing pattern associated with the PDSCH is to remain active (e.g., using communication manager 140, antenna 252, DEMOD 254, MIMO detector 256, receive processor 258, controller/processor 280, memory 282, and/or the like); and/or means for receiving an indication of a second number of instances, that is based at least in part on the first number of instances in which the activated puncturing pattern associated with the PDSCH is to remain active, that the UE is to transmit a report indicating the one or more INC matrices (e.g., using communication manager 140, antenna 252, DEMOD 254, MIMO detector 256, receive processor 258, controller/processor 280, memory 282, and/or the like).

In some aspects, the UE 120 includes means for receiving the indication of the second number of instances via a bitmap that includes a number of elements equal to the first number of instances in which the activated puncturing pattern associated with the PDSCH is to remain active (e.g., using communication manager 140, antenna 252, DEMOD 254, MIMO detector 256, receive processor 258, controller/processor 280, memory 282, and/or the like).

In some aspects, the UE 120 includes means for receiving an indication of one or more indices associated with one or more reporting locations, the one or more reporting locations indicating times at which the UE is to transmit a report indicating one or more INC matrices (e.g., using communication manager 140, antenna 252, DEMOD 254, MIMO detector 256, receive processor 258, controller/processor 280, memory 282, and/or the like).

In some aspects, the UE 120 includes means for receiving an indication that the UE is to report one or more INC matrices that were estimated using measurements that are associated with: sounded antenna elements of the UE, unsounded antenna elements of the UE, or sounded antenna elements and unsounded antenna elements of the UE (e.g., using communication manager 140, antenna 252, DEMOD 254, MIMO detector 256, receive processor 258, controller/processor 280, memory 282, and/or the like).

In some aspects, the UE 120 includes means for receiving an indication that the UE is to report one or more average INC matrices, an average INC matrix indicating a set of averaged elements across multiple INC matrices (e.g., using communication manager 140, antenna 252, DEMOD 254, MIMO detector 256, receive processor 258, controller/processor 280, memory 282, and/or the like). In some aspects, the UE 120 includes means for receiving an indication of an amount of time or a number of PDSCH communications that is associated with an average INC matrix of the one or more average INC matrices (e.g., using communication manager 140, antenna 252, DEMOD 254, MIMO detector 256, receive processor 258, controller/processor 280, memory 282, and/or the like).

In some aspects, the network node 110 includes means for transmitting a measurement configuration intended for a UE indicating one or more punctured resources of a PDSCH that can be used for measurements by the UE associated with estimating an INC matrix at the UE (e.g., using communication manager 150, controller/processor 240, transmit processor 220, TX MIMO processor 230, MOD 232, antenna 234, memory 242, and/or the like); means for transmitting a reporting configuration intended for the UE indicating one or more INC matrices at the UE to be reported by the UE (e.g., using communication manager 150, controller/processor 240, transmit processor 220, TX MIMO processor 230, MOD 232, antenna 234, memory 242, and/or the like); and/or means for receiving a report associated with the UE indicating the one or more INC matrices at the UE based at least in part on transmitting the reporting configuration (e.g., using communication manager 150, antenna 234, DEMOD 232, MIMO detector 236, receive processor 238, controller/processor 240, memory 242, and/or the like). The means for the network node 110 to perform operations described herein may include, for example, communication manager 150, transmit processor 220, TX MIMO processor 230, modulator 232, antenna 234, demodulator 232, MIMO detector 236, receive processor 238, controller/processor 240, memory 242, and/or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
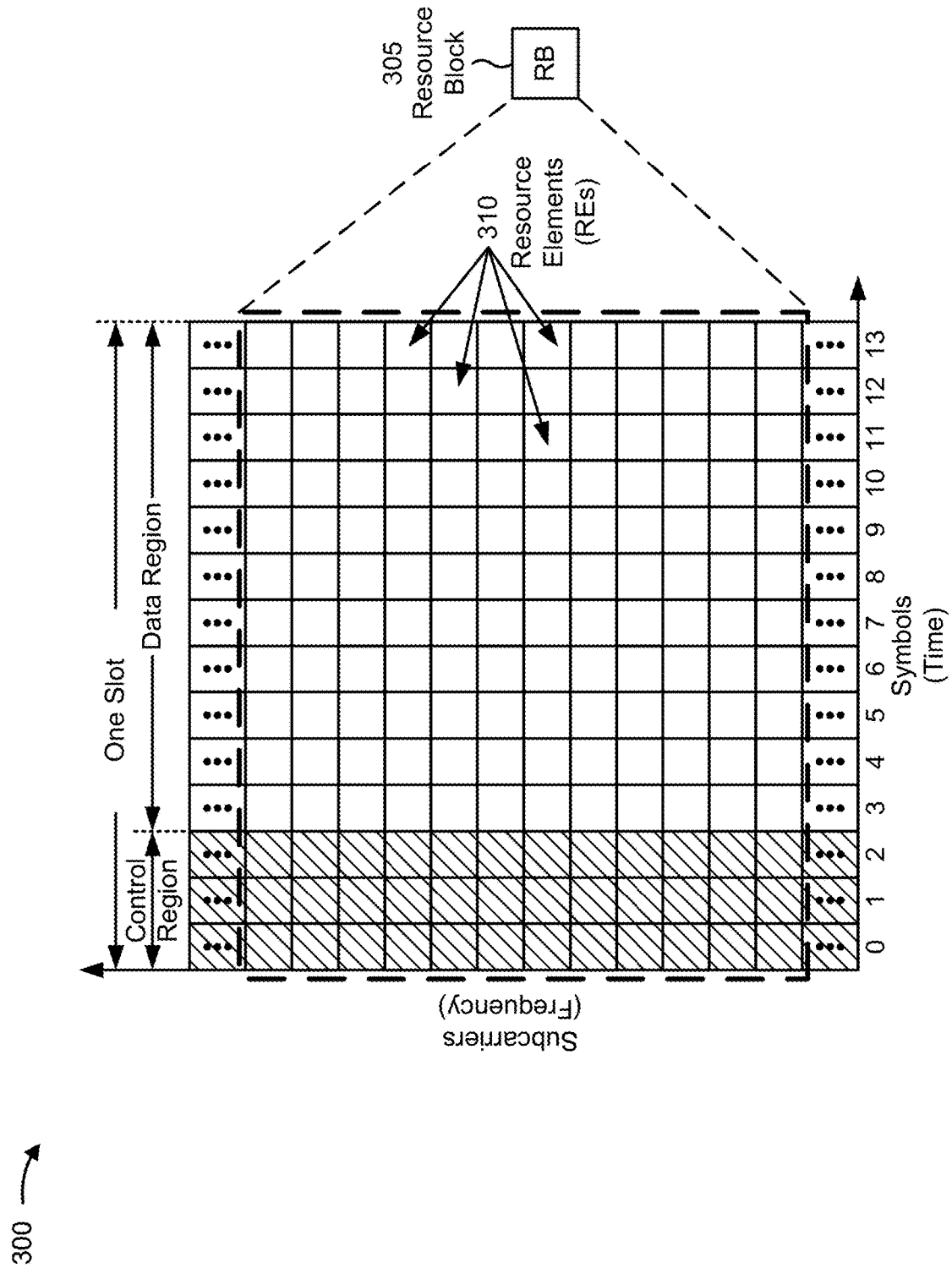
FIG. 3 is a diagram illustrating an example of a slot format, in accordance with the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a network node 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 milliseconds. Consequently, each slot may have a length of 0.25 milliseconds. However, a slot length may vary depending on a numerology used to communicate (e.g., a subcarrier spacing, a cyclic prefix format, among other examples). A slot may be configured with a link direction (e.g., downlink or uplink) for transmission. In some aspects, the link direction for a slot may be dynamically configured.

As indicated above, FIG. 3 is provided as an example. Other examples may differ from what is described with respect to FIG. 3.

Figure 4:
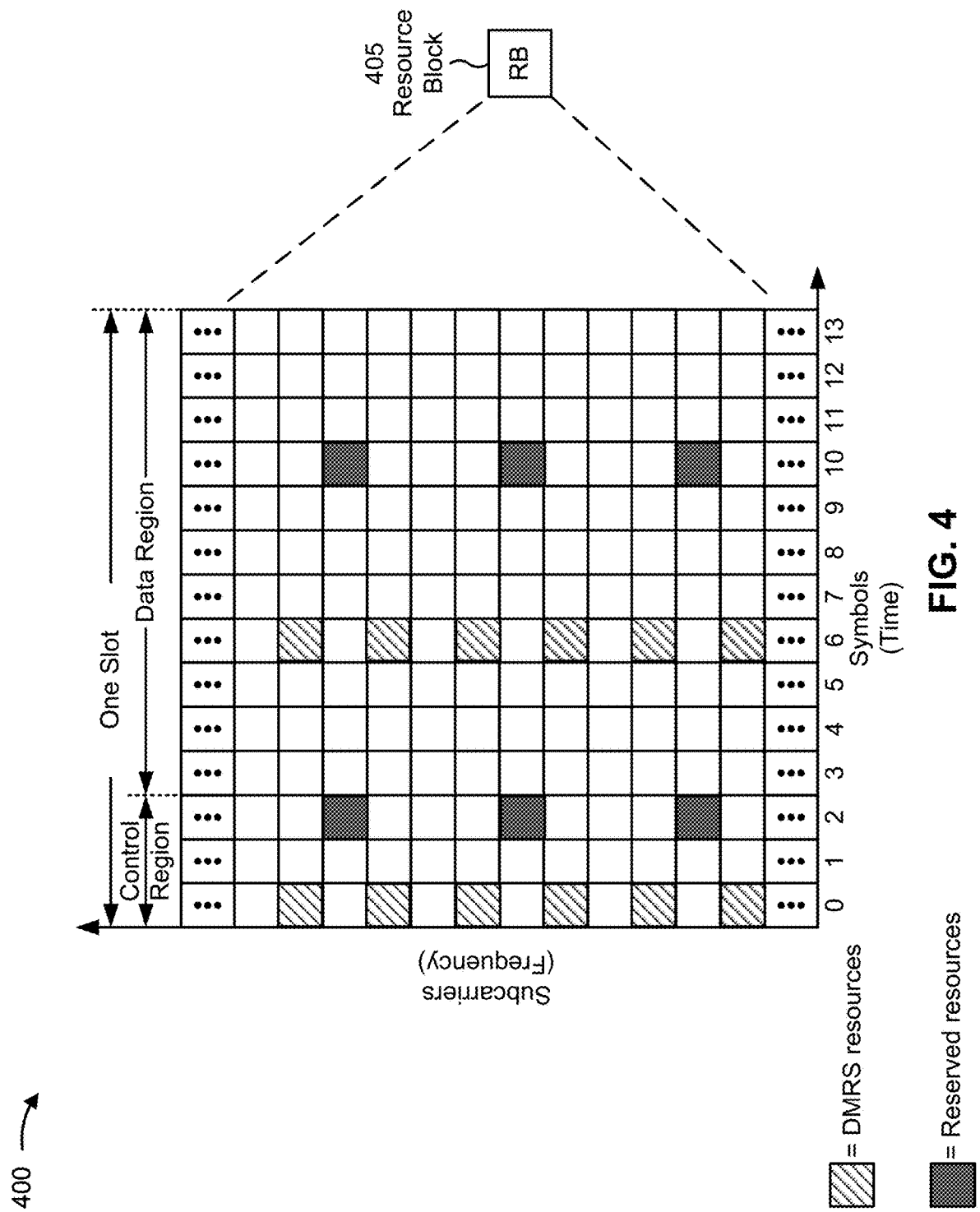
FIG. 4 is a diagram illustrating an example of a slot format of a physical downlink shared channel (PDSCH) transmission, in accordance with the present disclosure.

FIG. 4 is a diagram illustrating an example 400 of a slot format of a PDSCH transmission, in accordance with the present disclosure. As shown in FIG. 4, an RB 405 of the PDSCH transmission may include one or more demodulation reference signal (DMRS) resources (e.g., REs assigned to the PDSCH transmission that are associated with a DMRS transmitted by a network node 110). The RB 405 may include one or more reserved resources (e.g., REs assigned to the PDSCH transmission that are reserved by the network node 110). In some aspects, reserved resources may be referred to as null resources, punctured resources, and/or null DMRS resources, among other examples. For example, the reserved resources may be associated with a DMRS associated with the PDSCH transmission and/or may be associated with data symbols associated with the PDSCH transmission.

In some aspects, a network node 110 may reserve resources assigned to the PDSCH transmission following a pattern (e.g., a reserved resource pattern and/or a puncturing pattern). For example, the network node 110 may follow a pattern that is based at least in part on a DMRS frequency domain pattern (e.g., of the one or more DMRS resources) when reserving resources assigned to the PDSCH transmission. In some aspects, the network node 110 may apply a comb pattern when mapping the reserved resources to REs within a data region of the RB 405.

The network node 110 (or another network node 110, such as an RU) may indicate the pattern associated with the reserved resources to one or more UEs 120. For example, the network node 110 may indicate one or more reserved resource parameters (e.g., null resource parameters and/or rate matching parameters) in a radio resource control (RRC) configuration (e.g., within a PDSCH-Config configuration). In some aspects, the network node 110 may dynamically indicate one or more RRC configured reserved resource parameters in downlink control information (DCI) that schedules the PDSCH transmission. For example, the DCI may indicate one or more RRC configured rate matching patterns (e.g., in an entry of a time domain resource allocation (TDRA) table).

As described above, in some aspects, the reserved resources may be punctured resources (e.g., resources that are punctured by the network node 110 such that the resources carry no data). For example, the network node 110 may puncture a resource by removing one or more parity bits associated with the resource after performing an encoding procedure. In some aspects, the resources to be punctured by the network node 110 may be indicated in an RRC configuration or defined, or otherwise fixed, by a wireless communication standard, such as a 3GPP standard. In some aspects, an absolute location (e.g., an absolute time domain location and/or an absolute frequency domain location) of the resources assigned to the PDSCH transmission that are to be punctured may be indicated in the RRC configuration or wireless communication standard. In some aspects, a relative location (e.g., a relative time domain location and/or a relative frequency domain location) of the resources assigned to the PDSCH transmission that are to be punctured may be indicated in the RRC configuration or wireless communication standard (e.g., a location relative to the resources assigned to the PDSCH communication). A UE 120 that receives a PDSCH transmission that includes punctured resources may decode the PDSCH transmission based at least in part on a scheduling DCI that is associated with the PDSCH transmission and/or the puncturing pattern associated with the PDSCH transmission (e.g., based at least in part on the resources assigned to the PDSCH transmission that have been punctured by the network node 110).

In some aspects, a network node 110 may indicate when a PDSCH transmission includes punctured resources. For example, the network node 110 may transmit a DCI that schedules the PDSCH transmission. The DCI may include an indicator that indicates whether the PDSCH transmission includes resources that have been punctured by the network node 110. In some aspects, the UE 120 may determine whether a PDSCH transmission includes punctured resources based at least in part on one or more rules configured by the network (e.g., by a network node 110). The one or more rules may indicate one or more radio network temporary identifiers (RNTIs), one or more DCI formats, one or more search spaces, and/or one or more control resource sets (CORESETs), among other examples, that are associated with PDSCH transmissions that include punctured resources. For example, if a scheduling DCI associated with a PDSCH transmission is transmitted using an RNTI, a DCI format, a search space, and/or a CORESET that are indicated by the one or more rules, the UE 120 may determine that the PDSCH transmission includes punctured resources.

As shown in FIG. 4, the reserved resources may be located together with PDSCH data symbols (e.g., PDSCH data REs). The reserved resources may be indicated as not available for the PDSCH transmission. That is, the reserved resources may not be available (e.g., may be unavailable) to carry data associated with the PDSCH transmission. The network node 110 may consider the reserved resources when determining a transport block size (TBS) associated with the PDSCH transmission. For example, the network node 110 may sum a number of REs associated with a DMRS for each PRB (e.g., per PRB), in a scheduled duration of the PDSCH transmission, that includes an overhead associated with the DMRS code division multiplexing (CDM) groups without data and the number of REs associated with reserved resources per PRB. The network node 110 may determine a TBS associated with the PDSCH transmission based at least in part on the summation of the number of REs associated with a DMRS per PRB, as described above. Additionally, the network node 110 may consider rate matched REs that are not available for the PDSCH transmission (e.g., rate matched REs indicated as reserved resources) when determining a number of available REs associated with the PDSCH transmission.

As indicated above, FIG. 4 is provided as an example. Other examples may differ from what is described with respect to FIG. 4.

In some aspects, a UE 120 or a network node 110 may estimate an interference plus noise covariance (INC) matrix associated with a channel at a receiver (e.g., a UE). The INC matrix may be based at least in part on an interference vector indicating measured interference associated with the receiver and a noise vector indicating measured noise associated with the receiver. The UE 120 and/or the network node 110 may utilize an INC matrix to assist with interference estimation of a PDSCH, beamforming, and/or estimation of a modulation and coding scheme (MCS) of a PDSCH, among other examples. However, as a quantity of receive antennas of the UE 120 increases, a complexity associated with estimation of an INC matrix of a channel at the UE receiver increases.

Some techniques and apparatuses described herein enable reporting of puncturing based INC matrix measurements. For example, a UE 120 may receive a measurement configuration that indicates one or more punctured resources of a PDSCH that can be used for measurements associated with estimating an INC matrix of the channel at the UE. The UE 120 may receive a reporting configuration indicating one or more INC matrices to be reported to a network node 110. The UE 120 may measure the PDSCH at the UE using the one or punctured resources (e.g., may measure an interference and/or a noise associated with the PDSCH at the UE using the one or more punctured resources). The UE 120 may transmit a report to a network node 110 indicating the one or more INC matrices at the UE 120. As a result, a complexity associated with estimating the INC matrix a UE 120 may be reduced by using punctured resources of the PDSCH to estimate the INC matrix.

Moreover, by reporting one or more INC matrices to the network node 110, the network node 110 may be enabled to determine a precoder for a PDSCH based at least in part on the one or more INC matrices at the UE. For example, without an INC matrix, the network node 110 may utilize a sounding reference signal (SRS) transmitted by the UE 120 to perform channel estimation. The network node 110 may determine a precoder for the PDSCH based at least in part on the channel estimation performed using the SRS. However, this determination does not consider interference and/or noise experienced at the UE 120, such as associated with the PDSCH. Therefore, when the UE 120 decodes the PDSCH that was transmitted by the network node 110 using the precoder, the UE 120 may experience interference due to the interference and/or noise experienced at the UE 120. However, if the one or more INC matrices are reported to the network node 110, the network node 110 may determine a precoder for the PDSCH based at least in part on the one or more INC matrices. As a result, a performance of a decoding procedure at the UE 120 may be improved as the precoder used by the network node 110 for the PDSCH considers the interference and/or noise experienced at the UE 120. This may decrease a signal to noise ratio (SNR) experienced by the UE 120. Additionally, the network node 110 may be enabled to make improved decisions associated with determining an MCS and/or rank associated with the PDSCH based at least in part on receiving the reported INC matrices from the UE 120.

Figure 5:
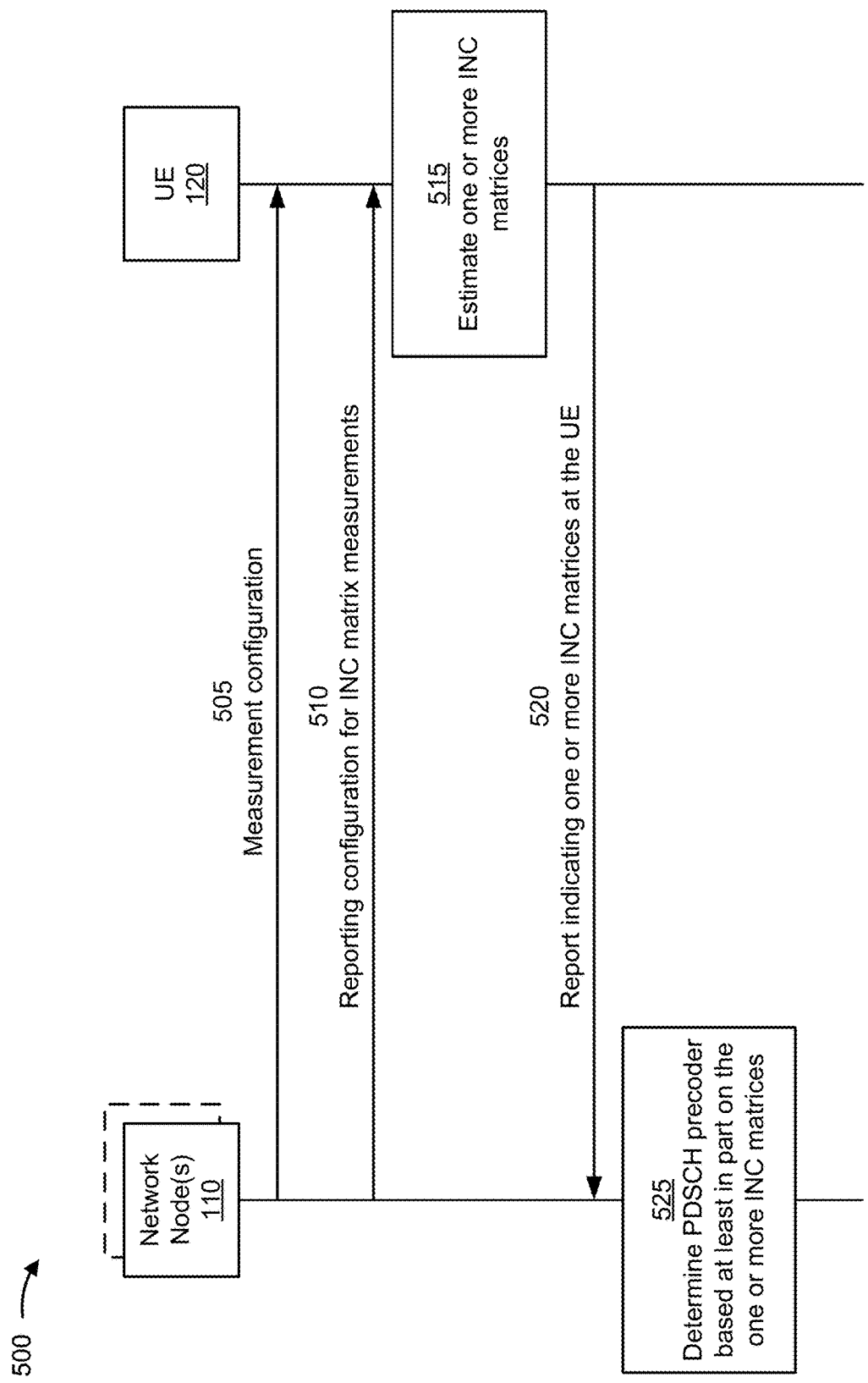
FIG. 5 is a diagram illustrating an example associated with reporting of puncturing based interference plus noise covariance (INC) matrix measurements, in accordance with the present disclosure.

FIG. 5 is a diagram illustrating an example 500 associated with reporting of puncturing based INC matrix measurements, in accordance with the present disclosure. As shown in FIG. 5, example 500 includes communication between one or more network nodes 110 and a UE 120. In some aspects, the network node 110 and the UE 120 may be included in a wireless network, such as wireless network 100. The network node 110 and the UE 120 may communicate via a wireless access link, which may include an uplink and a downlink.

As used herein, the network node 110 "transmitting" a communication or signal to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU transmitting a communication to an RU and the RU transmitting a communication to the UE 120. Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting a communication to the DU.

As shown by reference number 505, the network node 110 may transmit, and the UE 120 may receive, a measurement configuration indicating one or more punctured resources of a PDSCH that can be used for measurements associated with estimating an INC matrix at the UE 120. In some aspects, the measurement configuration may be referred to as a measurement trigger, a puncturing trigger, and/or a puncturing configuration, among other examples.

In some aspects, the network node 110 may transmit an indication of one or more puncturing patterns associated with the PDSCH (e.g., a pattern of REs assigned to the PDSCH that are to be punctured by the network node 110). In some aspects, the network node 110 may configure the one or more puncturing patterns, such as in an RRC configuration, for example.

In some aspects, the network node 110 may transmit downlink control information (DCI) that activates one or more puncturing patterns associated with the PDSCH (e.g., activates one or more puncturing patterns from configured puncturing patterns). In some aspects, the activation of the one or more puncturing patterns may remain active for an amount of time or a number of instances. For example, the activation of the one or more puncturing patterns may apply to a next three PDSCH communications transmitted by the network node 110 or a next three downlink grants associated with the PDSCH. The network node 110 may transmit an indication of the amount of time or the number of instances in which an activated puncturing pattern associated with the PDSCH is to remain active. For example, the network node 110 may transmit the indication semi-statically (e.g., in an RRC message or a medium access control (MAC) control element (MAC-CE) message) or dynamically (e.g., in a DCI message, that may be the DCI message that activates the one or more puncturing patterns or a different DCI message).

As shown by reference number 510, the network node 110 may transmit, and the UE 120 may receive, a reporting configuration indicating one or more INC matrices at the UE 120 to be reported by the UE 120. In some aspects, the reporting configuration may be referred to as a reporting trigger. In some aspects, the measurement configuration and the reporting configuration may be transmitted in the same downlink communication (e.g., the measurement configuration and the reporting configuration may be included in a joint indication). In some aspects, the network node 110 may transmit the measurement configuration in a first downlink communication and the reporting configuration in a second downlink communication (e.g., the measurement configuration and the reporting configuration may be separate indications).

In some aspects, the reporting configuration may indicate that the UE 120 is to report INC matrices at the UE 120 for one or more PRBs of the PDSCH, one or more PRB groups (PRGs) of the PDSCH, one or more subbands of the PDSCH, and/or a wideband across all PRBs of the PDSCH, among other examples. A PRG of the PDSCH may include two PRBs, four PRBs, or all PRBs of the PDSCH, for example. An INC matrix for a PRG may be an average of INC matrices of all REs associated with the resource blocks (RBs) of each PRB associated with the PRG. A subband of the PDSCH may include multiple PRBs of the PDSCH, such as 10 PRBs, for example. When reporting an INC matrix for a subband, the UE 120 may report an average of INC matrices of each RE of all RBs of the subband. Similarly, an INC matrix for a wideband may be an average of INC matrices for all INC matrixes of all REs across all RBs of the wideband.

In some aspects, the reporting configuration may indicate uplink resources to be used by the UE 120 to transmit the report. The uplink resources may include uplink resources associated with acknowledgement or negative acknowledgement (ACK/NACK) feedback associated with the PDSCH, uplink resources that are separate from uplink resources associated with ACK/NACK feedback associated with the PDSCH, uplink resources associated with a physical uplink control channel (PUCCH), and/or uplink resources associated with a physical uplink shared channel (PUSCH), among other examples.

For example, the reporting configuration may indicate a timing associated with transmitting the report to the network node 110. The timing may be at an uplink grant associated with ACK/NACK feedback for a PDSCH communication. In some aspects, the timing may be at an uplink grant that is different than the uplink grant associated with ACK/NACK feedback for a PDSCH communication. For example, the reporting configuration may indicate that the UE 120 is to transmit the report in an uplink control information (UCI) communication. The reporting configuration may indicate that the UE 120 is to use a two-stage UCI, with one stage of the UCI indicating ACK/NACK feedback associated with the PDSCH communication and another stage of the UCI indicating the report. In some aspects, the reporting configuration may indicate that a PUSCH communication is to be scheduled for the UE 120 to transmit the report in the PUSCH communication (or the reporting configuration may schedule the PUSCH communication).

In some aspects, the network node 110 may transmit the reporting configuration using DCI that triggers the UE 120 to transmit one or more reports indicating one or more INC matrices at the UE 120. In some aspects, the reporting configuration may be based at least in part on the measurement configuration. For example, as described above, the measurement configuration may indicate that one or more puncturing patterns of a PDSCH may be activated for a next X instances (e.g., a next X downlink grants or a next XPDSCH communications transmitted by the network node 110). The reporting configuration may indicate that the UE 120 is to transmit a report at Y instances of the next X instances, where Y is equal to X or less than X. A value of Y may be configured by the network node 110 using an RRC message, a MAC-CE message, or a DCI message (e.g., the DCI message that triggers the UE 120 to transmit the one or more reports, or a different DCI message). For example, the network node 110 may configure a value for Y, and transmit DCI that triggers the UE 120 to transmit reports indicating one or more INC matrices at the UE 120 at the next Y instances.

In some aspects, Y may not be a next number of consecutive instances. For example, if one or more puncturing patterns of a PDSCH may be activated for a next six instances, Y may indicate that the UE 120 is to transmit a report at the $3^{rd}$ instance and the $6^{th}$ instance, for example. In some aspects, Y may not be explicitly indicated by the network node 110. For example, the network node 110 may transmit a bitmap that includes X elements, where Y elements of the X elements are non-zero (e.g., have a value of 1). The UE 120 may determine when the UE 120 is to transmit a report based at least in part on identifying the Y non-zero elements in the bitmap. In some aspects, the network node 110 may indicate Y by transmitting an indication of one or more indices associated with one or more reporting locations, the one or more reporting locations indicating times at which the UE 120 is to transmit the report indicating one or more INC matrices. This may reduce an overhead associated with signaling the reporting configuration.

In some aspects, the instances (e.g., Y) in which the UE 120 is to transmit a report indicating the one or more INC matrices may be based at least in part on a coherence time of an interference channel associated with the PDSCH, and/or an interference pattern associated with the PDSCH, among other examples. For example, the network node 110 or the UE 120 may determine that the UE 120 experiences interference associated with the PDSCH, at the UE 120, every number of slots or every number of PDSCH downlink grants. The network node 110 (or another network node, such as a DU or a CU) may determine the reporting configuration based at least in part on the interference pattern experienced by the UE 120. In this way, a signaling overhead associated with transmitting the report may be reduced as the network node 110 may configure the UE 120 to transmit reports in a similar pattern (e.g., at a similar time) to the interference pattern experienced by the UE 120, rather than configuring the UE 120 to transmit a report at times during which the UE 120 is not experiencing interference associated with the PDSCH.

In some aspects, the reporting configuration may indicate that the UE 120 is to report one or more INC matrices that were estimated using measurements that are associated with sounded antenna elements of the UE 120, unsounded antenna elements of the UE 120, and/or both sounded antenna elements and unsounded antenna elements of the UE 120. A sounded antenna element may be an antenna element of the UE 120 that was sounded for channel estimation, in the uplink, by transmitting a sounding reference signal (SRS) to the network node 110 using the antenna elements.

In some aspects, the reporting configuration may indicate that the UE 120 is to report one or more average INC matrices. An average INC matrix may indicate a set of averaged elements across multiple INC matrices. As described above, the reporting configuration may indicate that the UE 120 is to transmit a report at Y of the next X instances that a measurement configuration (e.g., a puncturing pattern) is active. For example, the measurement configuration may indicate that a puncturing pattern is active for a next ten PDSCH communications. The reporting configuration may indicate that the UE 120 is to transmit a report at the $5^{th}$ PDSCH communication (e.g., using uplink resources associated with the $5^{th}$ PDSCH communication) and the $10^{th}$ PDSCH communication (e.g., using uplink resources associated with the $10^{th}$ PDSCH communication). The reporting configuration may indicate that the report at the $5^{th}$ PDSCH communication is to indicate an average INC matrix based at least in part on INC matrices measured using the $1^{st}$ through $5^{th}$ PDSCH communications. For example, the UE 120 may measure each PDSCH communication to estimate one or more INC matrices associated with the PDSCH communication. At the $5^{th}$ PDSCH communication, the UE 120 may average each estimated INC matrix and transmit the report indicating the averaged INC matrix across the $1^{st}$ through $5^{th}$ PDSCH communications. Similarly, at the $10^{th}$ PDSCH communication, the UE 120 may average each estimated INC matrix from the $6^{th}$ through $10^{th}$ PDSCH communications and transmit the report indicating the averaged INC matrix across the $6^{th}$ through $10^{th}$ PDSCH communications. This may reduce a size of a payload associated with the report and may reduce a signaling overhead associated with the UE 120 transmitting the report to the network node 110.

As shown by reference number 515, the UE 120 may estimate one or more INC matrices based at least in part on the PDSCH at the UE 120. The UE 120 may estimate the one or more INC matrices at the UE 120 in accordance with the measurement configuration and/or the reporting configuration. For example, the UE 120 may receive a PDSCH communication from the network node 110 that includes one or more punctured resources. The UE 120 may measure the PDSCH communication using the one or more punctured resources to estimate the one or more INC matrices at the UE 120. In some aspects, the UE 120 may estimate an INC matrix for one or more PRBs of the PDSCH, one or more PRGs of the PDSCH, one or more subbands of the PDSCH, and/or a wideband of the PDSCH. In some aspects, the UE 120 may determine an average INC matrix. For example, if the UE 120 is configured to estimate INC matrices for one or more PRBs of the PDSCH, the UE 120 may estimate an INC matrix for each PRB of the one or more PRBs and an average INC matrix across the INC matrices for each PRB of the one or more PRBs.

As shown by reference number 520, the UE 120 may transmit, and the network node 110 may receive, a report indicating the one or more INC matrices at the UE 120. The UE 120 may transmit the report based at least in part on receiving the reporting configuration and/or the measurement configuration from the network node 110. As an INC matrix is a Hermitian matrix, the UE 120 may not be required to transmit all elements of the INC matrix. As a Hermitian matrix is a complex-valued square matrix that is equal to the matrix's conjugate transpose, the element in the i-th row and j-th column of the matrix will be equal to the complex conjugate of the element in the j-th row and i-th column of the matrix, for all indices i and j of the matrix. As a result, the UE 120 may only need to transmit a subset of elements of the set of elements of the matrix, and the network node 110 (or another network node, such as a DU or a CU) may determine the remaining elements of the matrix based at least in part on the properties of the Hermitian matrix described above. For example, for an INC matrix, the UE 120 may transmit, in the report, an indication of the diagonal elements of the INC matrix and one of the upper off-diagonal elements of the INC matrix or one of the lower off-diagonal elements of the INC matrix. That is, if an INC matrix is $$\begin{bmatrix} A & B & C \\ D & E & F \\ G & H & I \end{bmatrix},$$

the UE 120 may transmit, in the report, an indication of elements A, E, and I (e.g., the diagonal elements) and either elements D, G, and H (e.g., the lower off-diagonal elements) or elements B, C, and F (e.g., the upper off-diagonal elements). The network node 110 may derive the full INC matrix based at least in part on the Hermitian properties of the INC matrix, as described above. In this way, a size of the payload of the report and a signaling overhead associated with transmitting the report may be reduced.

In some aspects, where the reporting configuration indicates that the UE 120 is to transmit multiple INC matrices in a report (e.g., INC matrices for multiple PRBs, multiple PRGs, and/or multiple subbands), the UE 120 may transmit the report including an INC matrix that is fully reported and the remaining INC matrices, of the multiple INC matrices, that are partially reported. A fully reported INC matrix may be an INC matrix that indicates the actual values for the elements (or the subset of elements, as described above) of the INC matrix. A partially reported INC matrix may be an INC matrix that indicates differential values for the elements (or the subset of elements, as described above) of the INC matrix. For example, the reporting configuration may indicate that the UE 120 is to transmit a fully reported INC matrix and one or more partially reported INC matrices. The UE 120 may transmit the report indicating elements of the INC matrix that is to be fully reported and elements of the partially reported INC matrices as differential elements relative to corresponding elements of the fully reported INC matrix. In some aspects, the fully reported INC matrix may be an INC matrix for a particular PRB (e.g., if the reporting configuration indicates that the UE 120 is to report INC matrices for multiple PRBs associated with the PDSCH) or an INC matrix for a particular subband (e.g., if the reporting configuration indicates that the UE 120 is to report INC matrices for multiple subbands associated with the PDSCH), among other examples. In some aspects, the fully reported INC matrix may be an average INC matrix across all INC matrices that are to be reported by the UE 120. That is, the UE 120 may fully report an average INC matrix across all INC matrices and partially report the INC matrices that are to be reported by the UE 120.

In some aspects, the reporting configuration may indicate that a subset of elements of an INC matrix to be reported (a fully reported INC matrix or a partially reported INC matrix) are to be reported as differential elements relative to another subset of elements of the INC matrix. For example, the UE 120 may transmit the report indicating a first subset of elements of a set of elements of an INC matrix and a second subset of elements, of the set of elements, as differential elements relative to corresponding elements of the first subset of elements. In some aspects, the first subset of elements may be quantized to a first quantization level (e.g., a first quantization level resolution, and/or a first number of bits) and the second subset of elements may be quantized to a second quantization level (e.g., a second quantization level resolution, and/or a second number of bits). In some aspects, the first quantization level may be larger than the second quantization level.

In some aspects, the first subset of elements may be the diagonal elements of the INC matrix. The second subset of elements may be the upper off-diagonal elements of the INC matrix or the lower off-diagonal elements of the INC matrix. For example, if an INC matrix is $$\begin{bmatrix} A & B \\ C & D \end{bmatrix},$$

then the UE 120 may transmit an indication of elements A and D at the first quantization level. Elements A and D may be used by the UE 120 as differential references for element C (e.g., the lower off-diagonal element) or element B (e.g., the upper off-diagonal element). For example, if the UE 120 is to report the lower off-diagonal elements of the INC matrix as the second subset of elements, the UE 120 may determine a difference between elements C and D and may quantize the difference to the second quantization level. In other words, each diagonal element of the INC matrix may serve as a differential reference for the row of elements that the diagonal element is associated with.

In some aspects, the reporting configuration may indicate a first quantization level associated with a first INC matrix (such as a fully reported INC matrix) that is to be reported by the UE 120. For example, the reporting configuration may indicate that the first INC matrix is to be reported with K quantization levels (e.g., used per complex value). The reporting configuration may indicate a second quantization level associated with one or more other INC matrices (such as partially reported INC matrices) that are to be reported by the UE 120. In some aspects, the second quantization level may be lower than the first quantization level. For example, the UE 120 may transmit the first INC matrix at the first quantization level and the one or more other INC matrices at the second quantization level. This may reduce a size of the payload of the report and may reduce a signaling overhead associated with transmitting the report).

In some aspects, the reporting configuration may indicate that the one or more other INC matrices are to be reported with differential elements (e.g., as partially reported INC matrices) relative to the first INC matrix. For example, if the first INC matrix is $$\begin{bmatrix} A & B \\ C & D \end{bmatrix}$$

and a second INC matrix, of the one or more other INC matrices, is $$\begin{bmatrix} E & F \\ G & H \end{bmatrix},$$

then the UE 120 may quantize $$\left( \begin{bmatrix} A & B \\ C & D \end{bmatrix} - \begin{bmatrix} E & F \\ G & H \end{bmatrix} \right)$$

to a lower quantization level than the first quantization level (e.g., the second quantization level described above, or another quantization level).

As shown by reference number 525, the network node 110 (or another network node, such as a DU or a CU) may determine a precoder to be used by the network node 110 associated with the PDSCH based at least in part on one or more reported INC matrices at the UE 120. For example, the network node 110 (or another network node, such as a DU or a CU) may determine a precoder to be used by the network node 110 associated with the PDSCH based at least in part on a channel estimation (e.g., based at least in part on a channel estimation performed by the network node 110 using one or more SRSs transmitted by the UE 120) of the PDSCH and based at least in part on one or more reported INC matrices at the UE 120. For example, in some aspects, the network node 110 may modify a precoder for the PDSCH to consider noise levels and/or interference levels experiences at the UE 120 associated with the PDSCH. The network node 110 may use the precoder (e.g., that is based at least in part on the one or more reported INC matrices at the UE 120) for one or more upcoming PDSCH communications (e.g., the network node 110 may transmit one or more PDSCH communications to the UE using the precoder that is based at least in part on the one or more reported INC matrices at the UE 120).

In this way, the network node 110 may consider an estimated INC matrix at the UE 120 when determining a precoder to be used by the network node 110. As a result, a performance of a decoding procedure at the UE 120 may be improved as the precoder used by the network node 110 for the PDSCH considers the interference and/or noise experienced at the UE 120. This may decrease an SNR experienced by the UE 120. Additionally, the network node 110 may determine an MCS and/or rank associated with the PDSCH based at least in part on one or more reported INC matrices. This may improve beamforming procedures associated with the PDSCH and provide for a better estimation of the MCS based at least in part on a modified beamformer. Furthermore, the estimated INC matrix, reported by the UE 120, can be used by the network node 110 for future PDSCH transmissions and/or for retransmissions of the PDSCH's data in case of NACK. Thus, the reporting of the estimated INC matrix improves performance of the future PDSCH transmissions and/or retransmissions, which improves utilization of network resources and increases throughput.

As indicated above, FIG. 5 is provided as an example. Other examples may differ from what is described with respect to FIG. 5.

Figure 6:
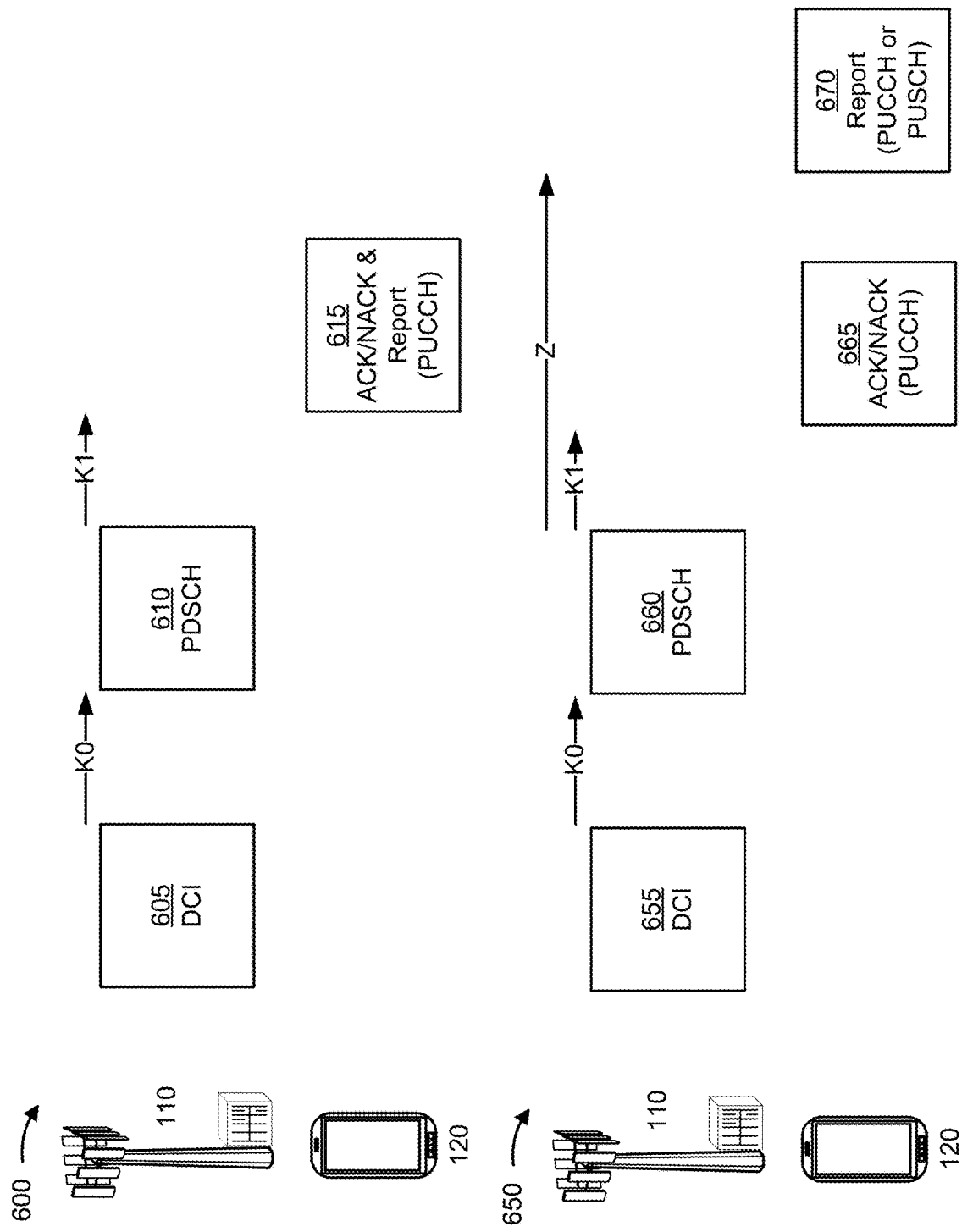
FIG. 6 is a diagram illustrating examples associated with reporting of puncturing based INC matrix measurements, in accordance with the present disclosure.

FIG. 6 is a diagram illustrating examples 600 and 650 associated with reporting of puncturing based INC matrix measurements, in accordance with the present disclosure. As shown in FIG. 5, example 500 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink. Examples 600 and 650 depict examples associated with a reporting time and/or reporting resources to be used by the UE 120 for transmitting a report indicating one or more INC matrices, as described in connection with FIG. 5.

As shown in example 600, and by reference number 605, the network node 110 may transmit DCI to the UE 120 that schedules a PDSCH communication. In some aspects, the DCI may indicate (or activate) a measurement configuration and/or a reporting configuration described above in connection with FIG. 5. In some aspects, the DCI may indicate uplink resources to be used by the UE 120 to transmit ACK/NACK feedback associated with the PDSCH communication. In some aspects, the DCI may indicate uplink resources to be used by the UE 120 to transmit a report indicating one or more INC matrices associated with the PDSCH communication (and/or one or more other PDSCH communications). As shown in example 600, the UE 120 may be configured or indicated to use the same uplink resources to transmit the ACK/NACK feedback associated with the PDSCH communication and the report indicating the one or more INC matrices associated with the PDSCH communication (and/or one or more other PDSCH communications).

As shown by reference number 610, the network node 110 may transmit, and the UE 120 may receive, the PDSCH communication. The network node 110 may transmit the PDSCH communication after a first timing offset value K0 from the end of the DCI transmission. The UE 120 may receive the PDSCH communication and determine if the UE 120 was able to successfully decode the PDSCH communication (e.g., to determine ACK/NACK feedback associated with the PDSCH communication). The UE 120 may measure one or more punctured resources associated with the PDSCH communication to estimate one or more INC matrices communication at the UE 120, as described above in connection with FIG. 5. For example, a reporting configuration, as described above in connection with FIG. 5, may indicate that the UE 120 is to transmit a report indicating the one or more INC matrices associated with the PDSCH communication (and/or one or more other PDSCH communications) after receiving the PDSCH communication.

As shown by reference number 615, the UE 120 may transmit a UCI communication using PUCCH resources for ACK/NACK feedback associated with the PDSCH transmission. For example, the PUCCH resources may be scheduled to occur after a second timing offset value K1 from the end of the PDSCH communication. The UCI communication may include the ACK/NACK feedback and the report indicating the one or more INC matrices associated with the PDSCH communication (and/or one or more other PDSCH communications).

As shown in example 650, and by reference number 655, the network node 110 may transmit DCI to the UE 120 that schedules a PDSCH communication. In some aspects, the DCI may indicate (or activate) a measurement configuration and/or a reporting configuration described above in connection with FIG. 5. In some aspects, the DCI may indicate uplink resources to be used by the UE 120 to transmit ACK/NACK feedback associated with the PDSCH communication. In some aspects, the DCI may indicate uplink resources to be used by the UE 120 to transmit a report indicating one or more INC matrices associated with the PDSCH communication (and/or one or more other PDSCH communications). As shown in example 650, the UE 120 may be configured or indicated to use different uplink resources to transmit the ACK/NACK feedback associated with the PDSCH communication and the report indicating the one or more INC matrices associated with the PDSCH communication (and/or one or more other PDSCH communications).

As shown by reference number 660, the network node 110 may transmit, and the UE 120 may receive, the PDSCH communication. The network node 110 may transmit the PDSCH communication after a first timing offset value K0 from the end of the DCI transmission. The UE 120 may receive the PDSCH communication and determine if the UE 120 was able to successfully decode the PDSCH communication (e.g., to determine ACK/NACK feedback associated with the PDSCH communication). The UE 120 may measure one or more punctured resources associated with the PDSCH communication to estimate one or more INC matrices communication at the UE 120, as described above in connection with FIG. 5. For example, a reporting configuration, as described above in connection with FIG. 5, may indicate that the UE 120 is to transmit a report indicating the one or more INC matrices associated with the PDSCH communication (and/or one or more other PDSCH communications) after receiving the PDSCH communication.

As shown by reference number 665, the UE 120 may transmit a UCI communication using a first set of uplink resources (e.g., PUCCH resources) for ACK/NACK feedback associated with the PDSCH transmission. For example, the PUCCH resources may be scheduled to occur after a second timing offset value K1 from the end of the PDSCH communication. The UCI communication may include the ACK/NACK feedback associated with the PDSCH communication.

As shown by reference number 670, the UE 120 may transmit a UCI communication using a second set of uplink resources (e.g., PUCCH resources or PUSCH resources) for transmitting the report indicating the one or more INC matrices associated with the PDSCH communication (and/or one or more other PDSCH communications). The second set of uplink resources may be scheduled to occur after a third timing offset value Z from the end of the PDSCH communication. For example, the UE 120 may transmit the ACK/NACK feedback and the report using a two-stage UCI communication (e.g., where a first stage of the UCI indicates the ACK/NACK feedback at a first time and the second stage of the UCI indicates the report at a second time). In some aspects, a PUSCH communication may be scheduled, after a third timing offset value Z from the end of the PDSCH communication, for the UE 120 to transmit the report indicating the one or more INC matrices associated with the PDSCH communication (and/or one or more other PDSCH communications) to the network node 110.

As indicated above, FIG. 6 is provided as an example. Other examples may differ from what is described with respect to FIG. 6.

Figure 7:
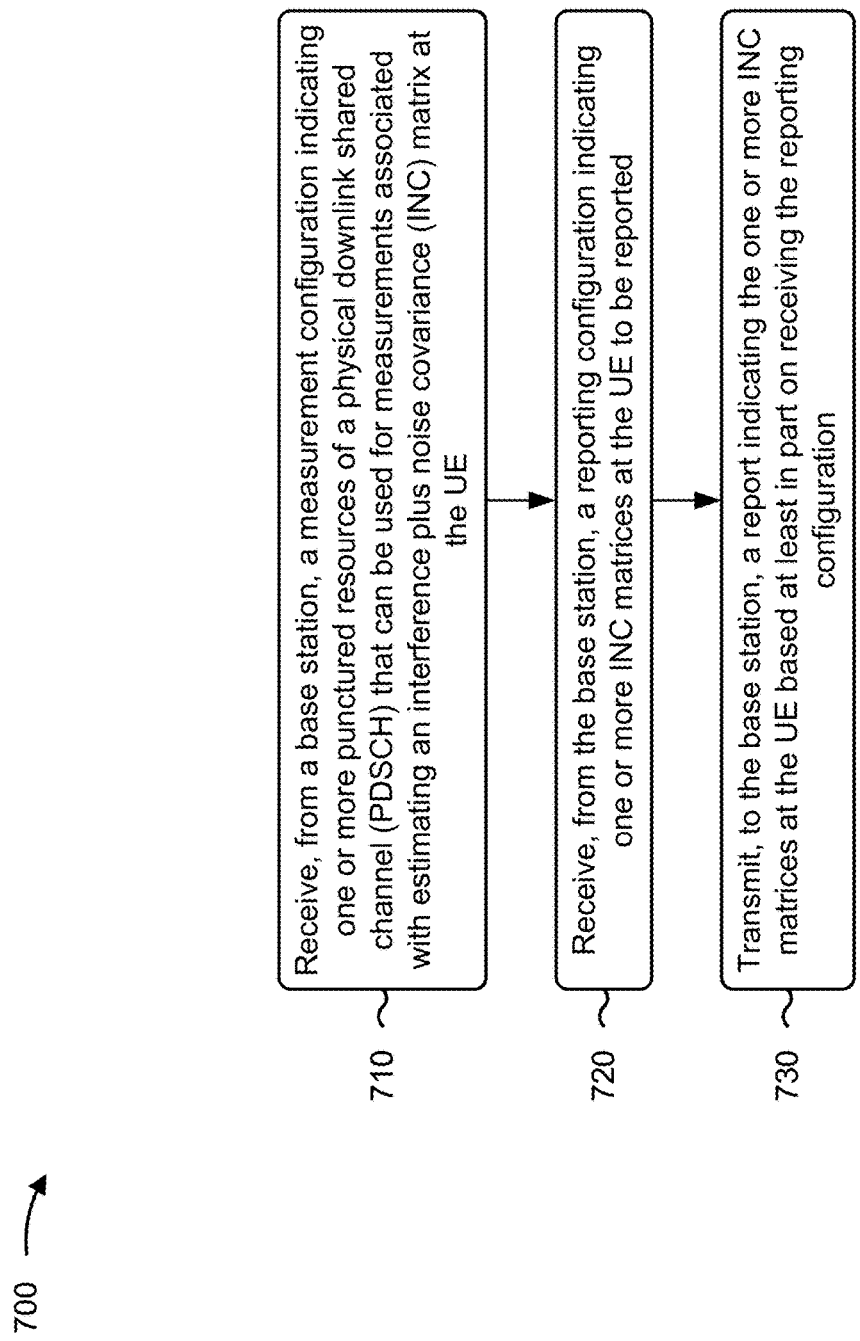
FIGS. 7 and 8 are diagrams illustrating example processes associated with reporting of puncturing based INC matrix measurements, in accordance with the present disclosure.

FIG. 7 is a diagram illustrating an example process 700 performed, for example, by a UE, in accordance with the present disclosure. Example process 700 is an example where the UE (e.g., UE 120) performs operations associated with reporting of puncturing based INC matrix measurements.

As shown in FIG. 7, in some aspects, process 700 may include receiving, from a network node, a measurement configuration indicating one or more punctured resources of a PDSCH that can be used for measurements associated with estimating an INC matrix at the UE (block 710). For example, the UE (e.g., using communication manager 140 and/or reception component 902, depicted in FIG. 9) may receive, from a network node, a measurement configuration indicating one or more punctured resources of a PDSCH that can be used for measurements associated with estimating an INC matrix at the UE, as described above.

As further shown in FIG. 7, in some aspects, process 700 may include receiving, from the network node, a reporting configuration indicating one or more INC matrices at the UE to be reported (block 720). For example, the UE (e.g., using communication manager 140 and/or reception component 902, depicted in FIG. 9) may receive, from the network node, a reporting configuration indicating one or more INC matrices at the UE to be reported, as described above.

As further shown in FIG. 7, in some aspects, process 700 may include transmitting, to the network node, a report indicating the one or more INC matrices at the UE based at least in part on receiving the reporting configuration (block 730). For example, the UE (e.g., using communication manager 140 and/or transmission component 904, depicted in FIG. 9) may transmit, to the network node, a report indicating the one or more INC matrices at the UE based at least in part on receiving the reporting configuration, as described above.

Process 700 may include additional aspects, such as any single aspect or any combination of aspects described below and/or in connection with one or more other processes described elsewhere herein.

In a first aspect, process 700 includes measuring the PDSCH using the one or more punctured resources to estimate the one or more INC matrices at the UE.

In a second aspect, alone or in combination with the first aspect, receiving the measurement configuration includes receiving the measurement configuration in a downlink communication, and receiving the reporting configuration includes receiving the reporting configuration in the downlink communication.

In a third aspect, alone or in combination with one or more of the first and second aspects, receiving the measurement configuration includes receiving the measurement configuration in a first downlink communication, and receiving the reporting configuration includes receiving the reporting configuration in a second downlink communication.

In a fourth aspect, alone or in combination with one or more of the first through third aspects, receiving the measurement configuration includes receiving, from the network node, an indication of one or more resource puncturing patterns associated with the PDSCH.

In a fifth aspect, alone or in combination with one or more of the first through fourth aspects, receiving the measurement configuration includes receiving, from the network node, DCI activating one or more resource puncturing patterns associated with the PDSCH.

In a sixth aspect, alone or in combination with one or more of the first through fifth aspects, receiving the measurement configuration includes receiving, from the network node, an indication of an amount of time or a number of instances in which an activated puncturing pattern associated with the PDSCH is to remain active.

In a seventh aspect, alone or in combination with one or more of the first through sixth aspects, receiving the indication of the amount of time or the number of instances in which the activated puncturing pattern associated with the PDSCH is to remain active includes receiving the indication via at least one of: an RRC message, a MAC-CE message, or a DCI message.

In an eighth aspect, alone or in combination with one or more of the first through seventh aspects, receiving the reporting configuration includes receiving, from the network node, an indication that the UE is to report INC matrices for at least one of: one or more PRBs of the PDSCH, one or more PRGs of the PDSCH, one or more subbands of the PDSCH, or a wideband across all PRBs of the PDSCH.

In a ninth aspect, alone or in combination with one or more of the first through eighth aspects, each INC matrix of the one or more INC matrices includes a set of elements, and transmitting the report indicating the one or more INC matrices includes transmitting, for an INC matrix of the one or more INC matrices, a subset of elements of the INC matrix from a set of elements of the INC matrix.

In a tenth aspect, alone or in combination with one or more of the first through ninth aspects, transmitting the report indicating the one or more INC matrices includes transmitting, to the network node, the report using uplink resources associated with acknowledgement or negative acknowledgement feedback associated with the PDSCH.

In an eleventh aspect, alone or in combination with one or more of the first through tenth aspects, receiving the reporting configuration includes receiving, from the network node, an indication of uplink resources to be used to transmit the report, and transmitting the report indicating the one or more INC matrices includes transmitting, to the network node, the report using the uplink resources.

In a twelfth aspect, alone or in combination with one or more of the first through eleventh aspects, the uplink resources include at least one of: uplink resources associated with ACK/NACK feedback associated with the PDSCH, uplink resources that are separate from uplink resources associated with ACK/NACK feedback associated with the PDSCH, uplink resources associated with a physical uplink control channel, or uplink resources associated with a physical uplink shared channel.

In a thirteenth aspect, alone or in combination with one or more of the first through twelfth aspects, transmitting the report indicating the one or more INC matrices includes transmitting, to the network node, the report and acknowledgement or negative acknowledgement feedback associated with the PDSCH in a two-stage uplink control information communication.

In a fourteenth aspect, alone or in combination with one or more of the first through thirteenth aspects, transmitting the report indicating the one or more INC matrices includes transmitting, to the network node, the report indicating elements of an INC matrix of the one or more INC matrices, and elements of the remaining INC matrices, of the one or more INC matrices, as differential elements relative to corresponding elements of the INC matrix.

In a fifteenth aspect, alone or in combination with one or more of the first through fourteenth aspects, transmitting the report indicating the one or more INC matrices includes transmitting, to the network node, the report indicating an INC matrix, of the one or more INC matrices, that includes a set of elements, where the report indicates a first subset of elements of the set of elements, and a second subset of elements, of the set of elements, as differential elements relative to corresponding elements of the first subset of elements.

In a sixteenth aspect, alone or in combination with one or more of the first through fifteenth aspects, the first subset of elements are quantized to a first quantization level and the second subset of elements are quantized to a second quantization level.

In a seventeenth aspect, alone or in combination with one or more of the first through sixteenth aspects, transmitting the report indicating the one or more INC matrices includes transmitting, to the network node, the report indicating an INC matrix, of the one or more INC matrices, that includes a set of elements quantized to a quantization level.

In an eighteenth aspect, alone or in combination with one or more of the first through seventeenth aspects, transmitting the report indicating the one or more INC matrices includes transmitting, to the network node, the report indicating an INC matrix, of the one or more INC matrices, that includes a set of elements quantized to a first quantization level, and remaining INC matrices, of the one or more INC matrices, that each include a set of elements quantized to a second quantization level.

In a nineteenth aspect, alone or in combination with one or more of the first through eighteenth aspects, transmitting the report indicating the one or more INC matrices includes transmitting, to the network node, the report indicating an INC matrix, of the one or more INC matrices, that includes a set of elements quantized to a first quantization level, and remaining INC matrices, of the one or more INC matrices, that each include a set of elements as differential elements relative to corresponding elements of the set of elements of the INC matrix, the differential elements quantized to a second quantization level.

In a twentieth aspect, alone or in combination with one or more of the first through nineteenth aspects, transmitting the report indicating the one or more INC matrices includes transmitting, to the network node, the report indicating an INC matrix, of the one or more INC matrices, that is a fully reported INC matrix, and remaining INC matrices, of the one or more INC matrices, that are partially reported INC matrices.

In a twenty-first aspect, alone or in combination with one or more of the first through twentieth aspects, receiving the reporting configuration includes receiving, from the network node, downlink control information triggering the UE to transmit one or more reports indicating one or more INC matrices.

In a twenty-second aspect, alone or in combination with one or more of the first through twenty-first aspects, receiving the measurement configuration includes receiving, from the network node, an indication of a first number of instances in which an activated puncturing pattern associated with the PDSCH is to remain active, and receiving the reporting configuration includes receiving an indication of a second number of instances, that is based at least in part on the first number of instances in which the activated puncturing pattern associated with the PDSCH is to remain active, that the UE is to transmit a report indicating the one or more INC matrices.

In a twenty-third aspect, alone or in combination with one or more of the first through twenty-second aspects, the one or more INC matrices are based at least in part on measurements performed using one or more punctured resources of the PDSCH indicated by the activated puncturing pattern.

In a twenty-fourth aspect, alone or in combination with one or more of the first through twenty-third aspects, receiving the indication of the second number of instances that the UE is to transmit the report indicating the one or more INC matrices includes receiving the indication of the second number of instances via at least one of: an RRC message, a MAC-CE message, or a DCI message.

In a twenty-fifth aspect, alone or in combination with one or more of the first through twenty-fourth aspects, receiving the indication of the second number of instances that the UE is to transmit the report indicating the one or more INC matrices includes receiving the indication of the second number of instances via a bitmap that includes a number of elements equal to the first number of instances in which the activated puncturing pattern associated with the PDSCH is to remain active.

In a twenty-sixth aspect, alone or in combination with one or more of the first through twenty-fifth aspects, the second number of instances is based at least in part on at least one of: a coherence time of an interference channel associated with the PDSCH, or an interference pattern associated with the PDSCH.

In a twenty-seventh aspect, alone or in combination with one or more of the first through twenty-sixth aspects, receiving the indication of the second number of instances that the UE is to transmit the report indicating the one or more INC matrices includes receiving an indication of one or more indices associated with one or more reporting locations, the one or more reporting locations indicating times at which the UE is to transmit a report indicating one or more INC matrices.

In a twenty-eighth aspect, alone or in combination with one or more of the first through twenty-seventh aspects, receiving the reporting configuration includes receiving an indication that the UE is to report one or more INC matrices that were estimated using measurements that are associated with sounded antenna elements of the UE, unsounded antenna elements of the UE, or sounded antenna elements and unsounded antenna elements of the UE.

In a twenty-ninth aspect, alone or in combination with one or more of the first through twenty-eighth aspects, receiving the reporting configuration includes receiving an indication that the UE is to report one or more average INC matrices, an average INC matrix indicating a set of averaged elements across multiple INC matrices.

In a thirtieth aspect, alone or in combination with one or more of the first through twenty-ninth aspects, receiving the indication that the UE is to report the one or more average INC matrices includes receiving an indication of an amount of time or a number of PDSCH communications that is associated with an average INC matrix of the one or more average INC matrices.

In a thirty-first aspect, alone or in combination with one or more of the first through thirtieth aspects, a precoder to be used by the network node associated with the PDSCH is based at least in part on the one or more INC matrices at the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
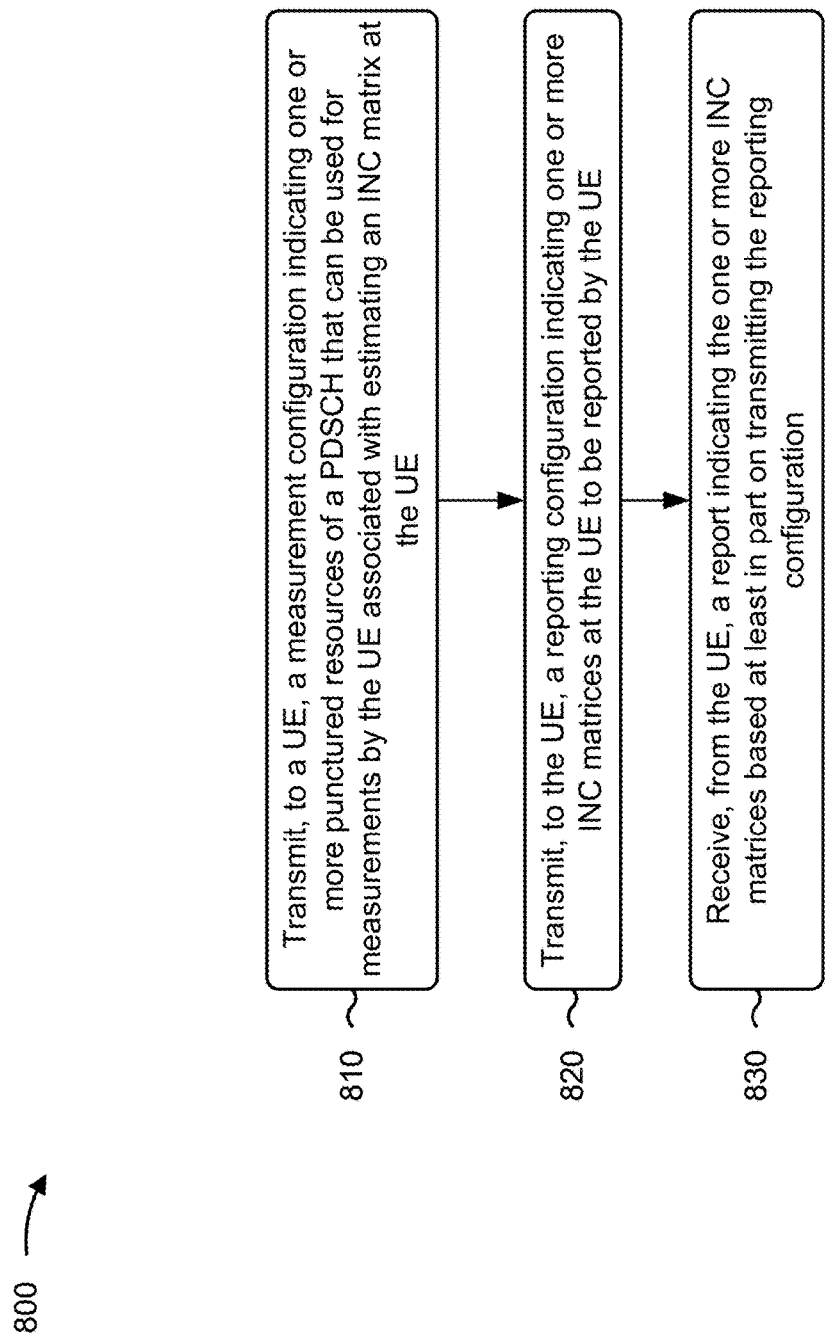

FIG. 8 is a diagram illustrating an example process 800 performed, for example, by a network node, in accordance with the present disclosure. Example process 800 is an example where the network node (e.g., the network node 110) performs operations associated with reporting of puncturing based INC matrix measurements.

As shown in FIG. 8, in some aspects, process 800 may include transmitting a measurement configuration intended for a UE indicating one or more punctured resources of a PDSCH that can be used for measurements by the UE associated with estimating an INC matrix at the UE (block 810). For example, the network node (e.g., using communication manager 150 and/or transmission component 1004, depicted in FIG. 10) may transmit a measurement configuration intended for a UE indicating one or more punctured resources of a PDSCH that can be used for measurements by the UE associated with estimating an INC matrix at the UE, as described above.

As further shown in FIG. 8, in some aspects, process 800 may include transmitting a reporting configuration intended for the UE indicating one or more INC matrices at the UE to be reported by the UE (block 820). For example, the network node (e.g., using communication manager 150 and/or transmission component 1004, depicted in FIG. 10) may transmit a reporting configuration intended for the UE indicating one or more INC matrices at the UE to be reported by the UE, as described above.

As further shown in FIG. 8, in some aspects, process 800 may include receiving a report associated with the UE indicating the one or more INC matrices at the UE based at least in part on transmitting the reporting configuration (block 830). For example, the network node (e.g., using communication manager 150 and/or reception component 1002, depicted in FIG. 10) may receive a report associated with the UE indicating the one or more INC matrices at the UE based at least in part on transmitting the reporting configuration, as described above.

Process 800 may include additional aspects, such as any single aspect or any combination of aspects described below and/or in connection with one or more other processes described elsewhere herein.

In a first aspect, process 800 includes determining the measurement configuration, and determining the reporting configuration.

In a second aspect, alone or in combination with the first aspect, transmitting the measurement configuration includes transmitting the measurement configuration in a downlink communication, and transmitting the reporting configuration includes transmitting the reporting configuration in the downlink communication.

In a third aspect, alone or in combination with one or more of the first and second aspects, transmitting the measurement configuration includes transmitting the measurement configuration in a first downlink communication, and transmitting the reporting configuration includes transmitting the reporting configuration in a second downlink communication.

In a fourth aspect, alone or in combination with one or more of the first through third aspects, transmitting the measurement configuration includes transmitting an indication of one or more resource puncturing patterns associated with the PDSCH.

In a fifth aspect, alone or in combination with one or more of the first through fourth aspects, transmitting the measurement configuration includes transmitting DCI activating one or more resource puncturing patterns associated with the PDSCH.

In a sixth aspect, alone or in combination with one or more of the first through fifth aspects, transmitting the measurement configuration includes transmitting an indication of an amount of time or a number of instances in which an activated puncturing pattern associated with the PDSCH is to remain active.

In a seventh aspect, alone or in combination with one or more of the first through sixth aspects, transmitting the indication of the amount of time or the number of instances in which the activated puncturing pattern associated with the PDSCH is to remain active includes transmitting the indication via at least one of: an RRC message, a MAC-CE message, or a DCI message.

In an eighth aspect, alone or in combination with one or more of the first through seventh aspects, transmitting the reporting configuration includes transmitting an indication that the UE is to report INC matrices for at least one of: one or more PRBs of the PDSCH, one or more PRGs of the PDSCH, one or more subbands of the PDSCH, or a wideband across all PRBs of the PDSCH.

In a ninth aspect, alone or in combination with one or more of the first through eighth aspects, each INC matrix of the one or more INC matrices includes a set of elements, and receiving the report indicating the one or more INC matrices includes receiving, for an INC matrix of the one or more INC matrices, a subset of elements of the INC matrix from a set of elements of the INC matrix.

In a tenth aspect, alone or in combination with one or more of the first through ninth aspects, receiving the report indicating the one or more INC matrices includes receiving the report using uplink resources associated with acknowledgement or negative acknowledgement feedback associated with the PDSCH.

In an eleventh aspect, alone or in combination with one or more of the first through tenth aspects, transmitting the reporting configuration includes transmitting an indication of uplink resources to be used to transmit the report, and receiving the report indicating the one or more INC matrices includes receiving the report using the uplink resources.

In a twelfth aspect, alone or in combination with one or more of the first through eleventh aspects, the uplink resources include at least one of: uplink resources associated with ACK/NACK feedback associated with the PDSCH, uplink resources that are separate from uplink resources associated with ACK/NACK feedback associated with the PDSCH, uplink resources associated with a physical uplink control channel, or uplink resources associated with a physical uplink shared channel.

In a thirteenth aspect, alone or in combination with one or more of the first through twelfth aspects, receiving the report indicating the one or more INC matrices includes receiving the report and acknowledgement or negative acknowledgement feedback associated with the PDSCH in a two-stage uplink control information communication.

In a fourteenth aspect, alone or in combination with one or more of the first through thirteenth aspects, receiving the report indicating the one or more INC matrices includes receiving the report indicating elements of an INC matrix of the one or more INC matrices, and elements of the remaining INC matrices, of the one or more INC matrices, as differential elements relative to corresponding elements of the INC matrix.

In a fifteenth aspect, alone or in combination with one or more of the first through fourteenth aspects, receiving the report indicating the one or more INC matrices includes receiving the report indicating an INC matrix, of the one or more INC matrices, that includes a set of elements, where the report indicates a first subset of elements of the set of elements, and a second subset of elements, of the set of elements, as differential elements relative to corresponding elements of the first subset of elements.

In a sixteenth aspect, alone or in combination with one or more of the first through fifteenth aspects, the first subset of elements are quantized to a first quantization level and the second subset of elements are quantized to a second quantization level.

In a seventeenth aspect, alone or in combination with one or more of the first through sixteenth aspects, receiving the report indicating the one or more INC matrices includes receiving the report indicating an INC matrix, of the one or more INC matrices, that includes a set of elements quantized to a quantization level.

In an eighteenth aspect, alone or in combination with one or more of the first through seventeenth aspects, receiving the report indicating the one or more INC matrices includes receiving the report indicating an INC matrix, of the one or more INC matrices, that includes a set of elements quantized to a first quantization level, and remaining INC matrices, of the one or more INC matrices, that each include a set of elements quantized to a second quantization level.

In a nineteenth aspect, alone or in combination with one or more of the first through eighteenth aspects, receiving the report indicating the one or more INC matrices includes receiving the report indicating an INC matrix, of the one or more INC matrices, that includes a set of elements quantized to a first quantization level, and remaining INC matrices, of the one or more INC matrices, that each include a set of elements as differential elements relative to corresponding elements of the set of elements of the INC matrix, the differential elements quantized to a second quantization level.

In a twentieth aspect, alone or in combination with one or more of the first through nineteenth aspects, receiving the report indicating the one or more INC matrices includes receiving the report indicating an INC matrix, of the one or more INC matrices, that is a fully reported INC matrix, and remaining INC matrices, of the one or more INC matrices, that are partially reported INC matrices.

In a twenty-first aspect, alone or in combination with one or more of the first through twentieth aspects, transmitting the reporting configuration includes transmitting downlink control information triggering the UE to transmit one or more reports indicating one or more INC matrices.

In a twenty-second aspect, alone or in combination with one or more of the first through twenty-first aspects, transmitting the measurement configuration includes transmitting an indication of a first number of instances in which an activated puncturing pattern associated with the PDSCH is to remain active, and transmitting the reporting configuration includes transmitting an indication of a second number of instances, that is based at least in part on the first number of instances in which the activated puncturing pattern associated with the PDSCH is to remain active, that the UE is to transmit a report indicating the one or more INC matrices.

In a twenty-third aspect, alone or in combination with one or more of the first through twenty-second aspects, the one or more INC matrices are based at least in part on measurements performed by the UE using one or more punctured resources of the PDSCH indicated by the activated puncturing pattern.

In a twenty-fourth aspect, alone or in combination with one or more of the first through twenty-third aspects, transmitting the indication of the second number of instances that the UE is to transmit the report indicating the one or more INC matrices includes transmitting the indication of the second number of instances via at least one of: an RRC message, a MAC-CE message, or a DCI message.

In a twenty-fifth aspect, alone or in combination with one or more of the first through twenty-fourth aspects, transmitting the indication of the second number of instances that the UE is to transmit the report indicating the one or more INC matrices includes transmitting the indication of the second number of instances via a bitmap that includes a number of elements equal to the first number of instances in which the activated puncturing pattern associated with the PDSCH is to remain active.

In a twenty-sixth aspect, alone or in combination with one or more of the first through twenty-fifth aspects, process 800 includes determining the second number of instances based at least in part on at least one of: a coherence time of an interference channel associated with the PDSCH, or an interference pattern associated with the PDSCH.

In a twenty-seventh aspect, alone or in combination with one or more of the first through twenty-sixth aspects, transmitting the indication of the second number of instances that the UE is to transmit the report indicating the one or more INC matrices includes transmitting an indication of one or more indices associated with one or more reporting locations, the one or more reporting locations indicating times at which the UE is to transmit a report indicating one or more INC matrices.

In a twenty-eighth aspect, alone or in combination with one or more of the first through twenty-seventh aspects, transmitting the reporting configuration includes transmitting an indication that the UE is to report one or more INC matrices that were estimated by the UE using measurements that are associated with sounded antenna elements of the UE, unsounded antenna elements of the UE, or sounded antenna elements and unsounded antenna elements of the UE.

In a twenty-ninth aspect, alone or in combination with one or more of the first through twenty-eighth aspects, transmitting the reporting configuration includes transmitting an indication that the UE is to report one or more average INC matrices, an average INC matrix indicating a set of averaged elements across multiple INC matrices.

In a thirtieth aspect, alone or in combination with one or more of the first through twenty-ninth aspects, transmitting the indication that the UE is to report the one or more average INC matrices includes transmitting an indication of an amount of time or a number of PDSCH communications that is associated with an average INC matrix of the one or more average INC matrices.

In a thirty-first aspect, alone or in combination with one or more of the first through thirtieth aspects, process 800 includes determining a precoder to be used by the network node associated with the PDSCH based at least in part on the one or more INC matrices at the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
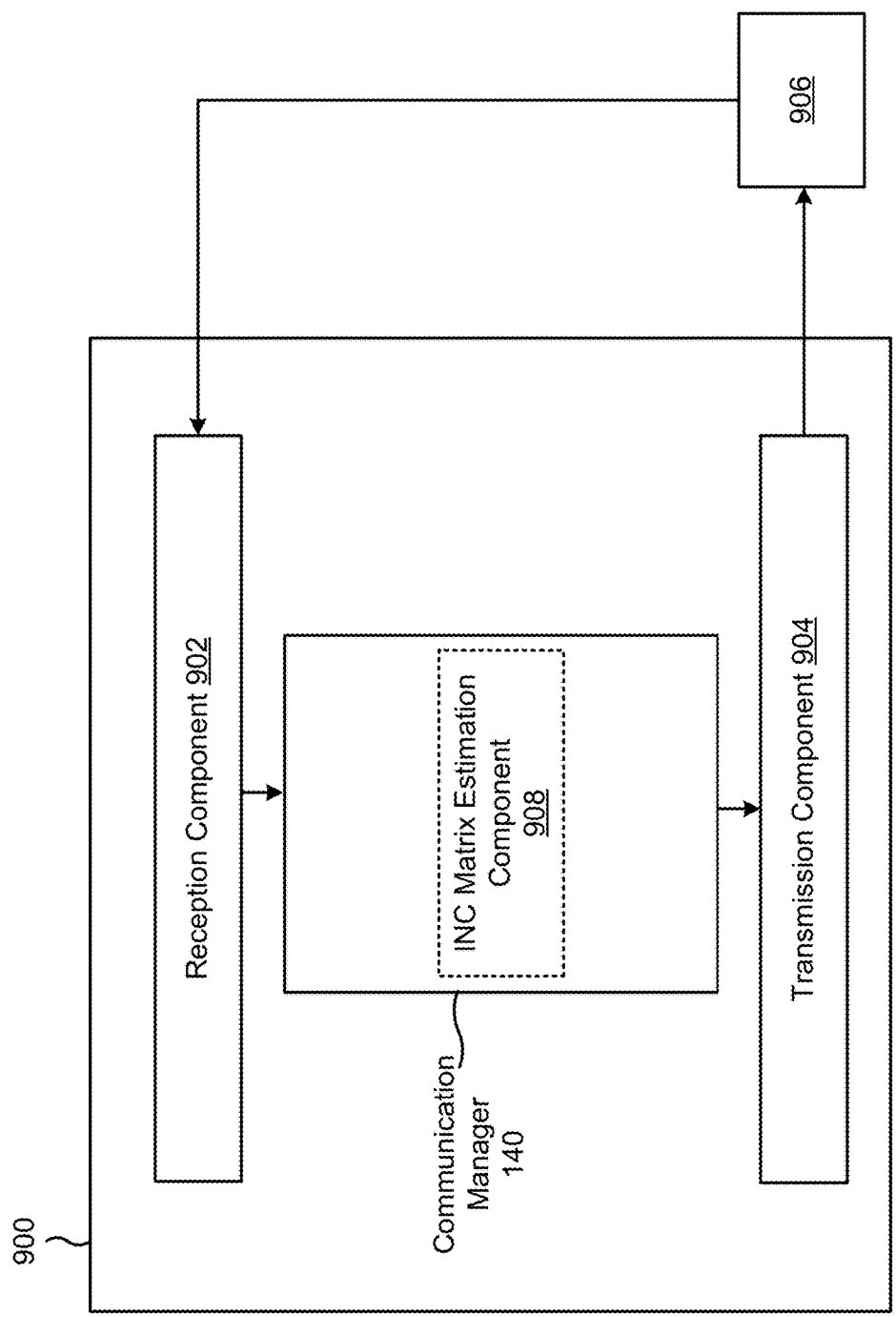
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include the communication manager 140. The communication manager 140 may include an INC matrix estimation component 908, among other examples.

In some aspects, the apparatus 900 may be configured to perform one or more operations described herein in connection with FIGS. 5 and/or 6. Additionally or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a network node, a measurement configuration indicating one or more punctured resources of a PDSCH that can be used for measurements associated with estimating an INC matrix at the UE. The reception component 902 may receive, from the network node, a reporting configuration indicating one or more INC matrices at the UE to be reported. The transmission component 904 may transmit, to the network node, a report indicating the one or more INC matrices at the UE based at least in part on receiving the reporting configuration.

The INC matrix estimation component 908 may measure the PDSCH using the one or more punctured resources to estimate the one or more INC matrices at the UE. In some aspects, the INC matrix estimation component 908 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
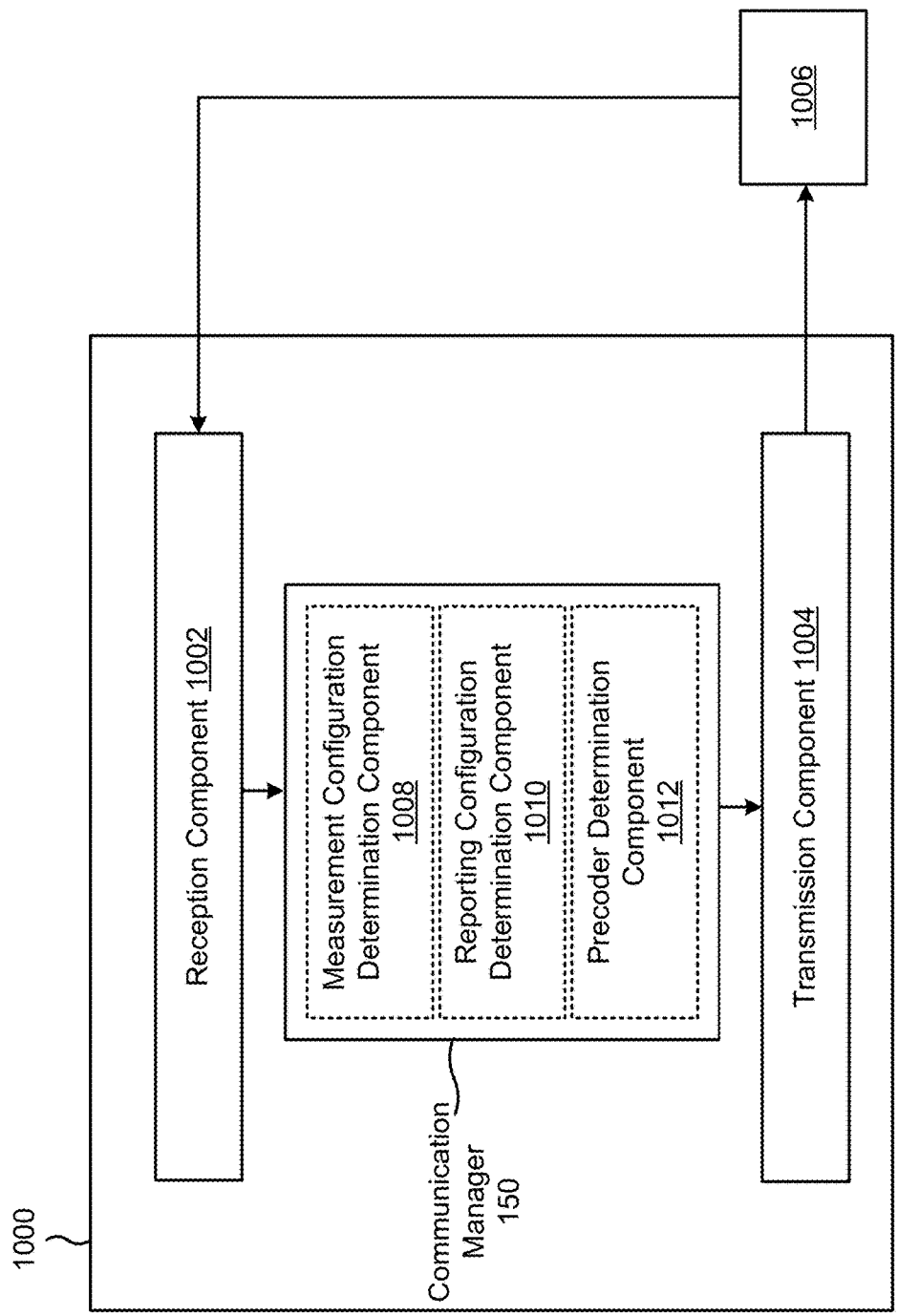

FIG. 10 is a block diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include the communication manager 150. The communication manager 150 may include one or more of a measurement configuration determination component 1008, a reporting configuration determination component 1010, or a precoder determination component 1012, among other examples.

In some aspects, the apparatus 1000 may be configured to perform one or more operations described herein in connection with FIGS. 5 and/or 6. Additionally or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the network node described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the network node described above in connection with FIG. 2. In some aspects, the transmission component 1004 may be co-located with the reception component 1002 in a transceiver.

The transmission component 1004 may transmit a measurement configuration intended for a UE indicating one or more punctured resources of a PDSCH that can be used for measurements by the UE associated with estimating an INC matrix at the UE. The transmission component 1004 may transmit a reporting configuration intended for the UE indicating one or more INC matrices at the UE to be reported by the UE. The reception component 1002 may receive a report associated with the UE indicating the one or more INC matrices at the UE based at least in part on transmitting the reporting configuration.

The measurement configuration determination component 1008 may determine the measurement configuration. In some aspects, the measurement configuration determination component 1008 may include a receive processor, a transmit MIMO processor, a transmit processor, a controller/processor, a memory, or a combination thereof, of the network node described above in connection with FIG. 2.

The reporting configuration determination component 1010 may determine the reporting configuration. In some aspects, the reporting configuration determination component 1010 may include a receive processor, a transmit MIMO processor, a transmit processor, a controller/processor, a memory, or a combination thereof, of the network node described above in connection with FIG. 2. The reporting configuration determination component 1010 may determine the second number of instances based at least in part on at least one of: a coherence time of an interference channel associated with the PDSCH, or an interference pattern associated with the PDSCH.

The precoder determination component 1012 may determine a precoder to be used by the network node associated with the PDSCH based at least in part on the one or more INC matrices at the UE. For example, the precoder may be used for one or more subsequent transmissions, such as one or more PDSCH transmissions or a retransmission of the PDSCH used to determine the precoder. In some aspects, the precoder determination component 1012 may include a receive processor, a transmit MIMO processor, a transmit processor, a controller/processor, a memory, or a combination thereof, of the network node described above in connection with FIG. 2.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 11:
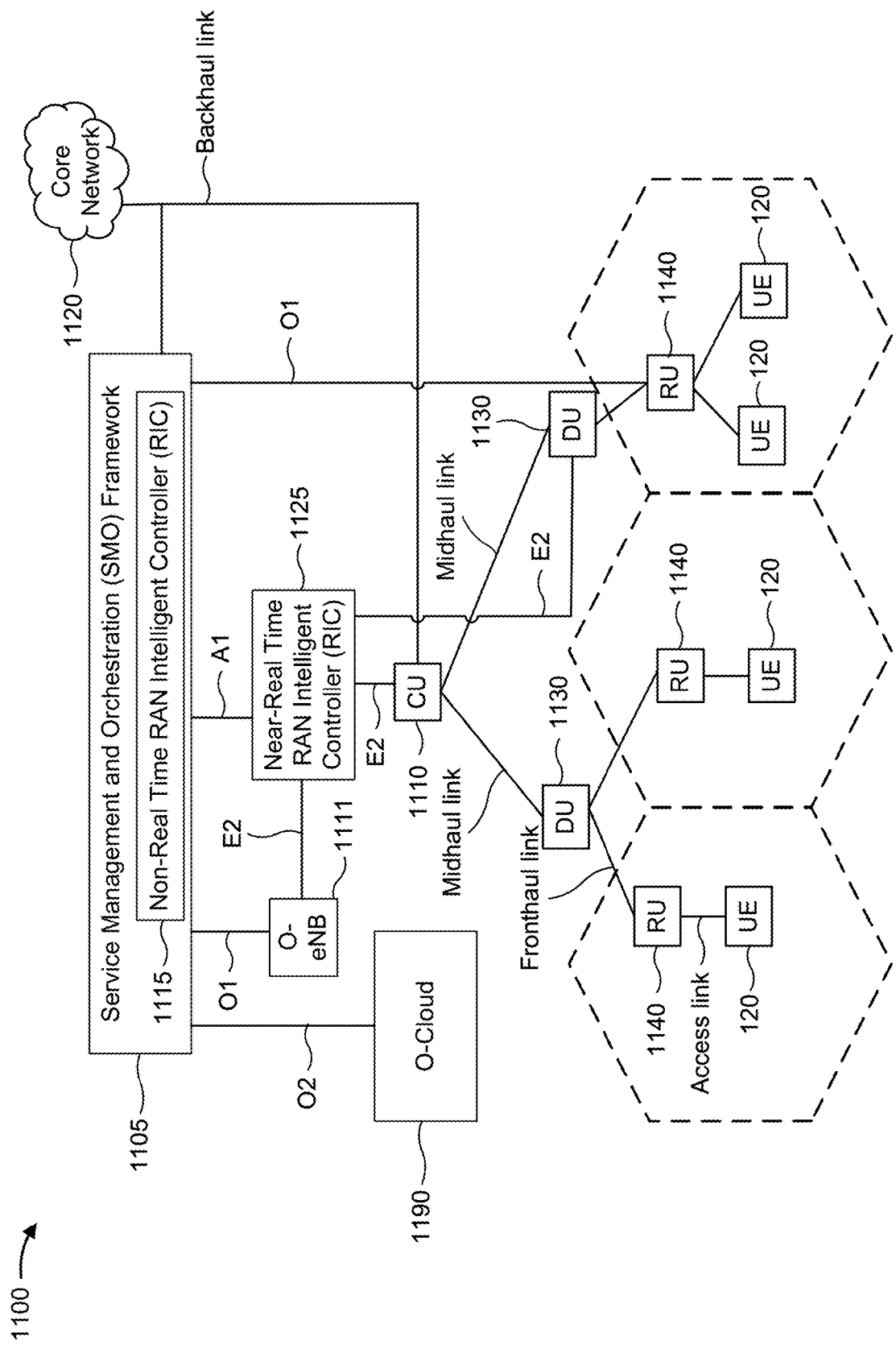
FIG. 11 is a diagram illustrating an example disaggregated base station architecture, in accordance with the present disclosure.

FIG. 11 is a diagram illustrating an example disaggregated base station architecture 1100, in accordance with the present disclosure. The disaggregated base station architecture 1100 may include a CU 1110 that can communicate directly with a core network 1120 via a backhaul link, or indirectly with the core network 1120 through one or more disaggregated control units (such as a Near-RT RIC 1125 via an E2 link, or a Non-RT RIC 1115 associated with a Service Management and Orchestration (SMO) Framework 1105, or both). A CU 1110 may communicate with one or more DUs 1130 via respective midhaul links, such as through F1 interfaces. Each of the DUs 1130 may communicate with one or more RUs 1140 via respective fronthaul links. Each of the RUs 1140 may communicate with one or more UEs 120 via respective radio frequency (RF) access links. In some implementations, a UE 120 may be simultaneously served by multiple RUs 1140.

Each of the units, including the CUs 1110, the DUs 1130, the RUs 1140, as well as the Near-RT RICs 1125, the Non-RT RICs 1115, and the SMO Framework 1105, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 1110 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 1110. The CU 1110 may be configured to handle user plane functionality (for example, Central Unit-User Plane (CU-UP) functionality), control plane functionality (for example, Central Unit-Control Plane (CU-CP) functionality), or a combination thereof. In some implementations, the CU 1110 can be logically split into one or more CU-UP units and one or more CU-CP units. A CU-UP unit can communicate bidirectionally with a CU-CP unit via an interface, such as the E1 interface when implemented in an O-RAN configuration. The CU 1110 can be implemented to communicate with a DU 1130, as necessary, for network control and signaling.

Each DU 1130 may correspond to a logical unit that includes one or more base station functions to control the operation of one or more RUs 1140. In some aspects, the DU 1130 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 1130 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 1130, or with the control functions hosted by the CU 1110.

Each RU 1140 may implement lower-layer functionality. In some deployments, an RU 1140, controlled by a DU 1130, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 1140 can be operated to handle over the air (OTA) communication with one or more UEs 120. In some implementations, real-time and non-real-time aspects of control and user plane communication with the RU(s) 1140 can be controlled by the corresponding DU 1130. In some scenarios, this configuration can enable each DU 1130 and the CU 1110 to be implemented in a cloud-based RAN architecture, such as a vRAN architecture.

The SMO Framework 1105 may be configured to support RAN deployment and provisioning of non-virtualized and virtualized network elements. For non-virtualized network elements, the SMO Framework 1105 may be configured to support the deployment of dedicated physical resources for RAN coverage requirements, which may be managed via an operations and maintenance interface (such as an O1 interface). For virtualized network elements, the SMO Framework 1105 may be configured to interact with a cloud computing platform (such as an open cloud (O-Cloud) platform 1190) to perform network element life cycle management (such as to instantiate virtualized network elements) via a cloud computing platform interface (such as an O2 interface). Such virtualized network elements can include, but are not limited to, CUs 1110, DUs 1130, RUs 1140, non-RT RICs 1115, and Near-RT RICs 1125. In some implementations, the SMO Framework 1105 can communicate with a hardware aspect of a 4G RAN, such as an open eNB (O-eNB) 1111, via an O1 interface. Additionally, in some implementations, the SMO Framework 1105 can communicate directly with each of one or more RUs 1140 via a respective O1 interface. The SMO Framework 1105 also may include a Non-RT RIC 1115 configured to support functionality of the SMO Framework 1105.

The Non-RT RIC 1115 may be configured to include a logical function that enables non-real-time control and optimization of RAN elements and resources, Artificial Intelligence/Machine Learning (AI/ML) workflows including model training and updates, or policy-based guidance of applications/features in the Near-RT MC 1125. The Non-RT MC 1115 may be coupled to or communicate with (such as via an A1 interface) the Near-RT RIC 1125. The Near-RT RIC 1125 may be configured to include a logical function that enables near-real-time control and optimization of RAN elements and resources via data collection and actions over an interface (such as via an E2 interface) connecting one or more CUs 1110, one or more DUs 1130, or both, as well as an O-eNB, with the Near-RT RIC 1125.

In some implementations, to generate AI/ML models to be deployed in the Near-RT RIC 1125, the Non-RT RIC 1115 may receive parameters or external enrichment information from external servers. Such information may be utilized by the Near-RT RIC 1125 and may be received at the SMO Framework 1105 or the Non-RT RIC 1115 from non-network data sources or from network functions. In some examples, the Non-RT RIC 1115 or the Near-RT RIC 1125 may be configured to tune RAN behavior or performance. For example, the Non-RT RIC 1115 may monitor long-term trends and patterns for performance and employ AI/ML models to perform corrective actions through the SMO Framework 1105 (such as reconfiguration via an O1 interface) or via creation of RAN management policies (such as A1 interface policies).

As indicated above, FIG. 11 is provided as an example. Other examples may differ from what is described with regard to FIG. 11.

The following provides an overview of some Aspects of the present disclosure:

Aspect 1: A method of wireless communication performed by a user equipment (UE), comprising: receiving, from a network node, a measurement configuration indicating one or more punctured resources of a physical downlink shared channel (PDSCH) that can be used for measurements associated with estimating an interference plus noise covariance (INC) matrix at the UE; receiving, from the network node, a reporting configuration indicating one or more INC matrices at the UE to be reported; and transmitting, to the network node, a report indicating the one or more INC matrices at the UE based at least in part on receiving the reporting configuration.

Aspect 2: The method of Aspect 1, further comprising: measuring the PDSCH using the one or more punctured resources to estimate the one or more INC matrices at the UE.

Aspect 3: The method of any of Aspects 1-2, wherein receiving the measurement configuration comprises receiving the measurement configuration in a downlink communication; and wherein receiving the reporting configuration comprises receiving the reporting configuration in the downlink communication.

Aspect 4: The method of any of Aspects 1-3, wherein receiving the measurement configuration comprises receiving the measurement configuration in a first downlink communication; and wherein receiving the reporting configuration comprises receiving the reporting configuration in a second downlink communication.

Aspect 5: The method of any of Aspects 1-4, wherein receiving the measurement configuration comprises: receiving, from the network node, an indication of one or more resource puncturing patterns associated with the PDSCH.

Aspect 6: The method of any of Aspects 1-5, wherein receiving the measurement configuration comprises: receiving, from the network node, downlink control information (DCI) activating one or more resource puncturing patterns associated with the PDSCH.

Aspect 7: The method of any of Aspects 1-6, wherein receiving the measurement configuration comprises: receiving, from the network node, an indication of an amount of time or a number of instances in which an activated puncturing pattern associated with the PDSCH is to remain active.

Aspect 8: The method of Aspect 7, wherein receiving the indication of the amount of time or the number of instances in which the activated puncturing pattern associated with the PDSCH is to remain active comprises receiving the indication via at least one of: a radio resource control (RRC) message, a medium access control (MAC) control element (MAC-CE) message, or a downlink control information (DCI) message.

Aspect 9: The method of any of Aspects 1-8, wherein receiving the reporting configuration comprises: receiving, from the network node, an indication that the UE is to report INC matrices for at least one of: one or more physical resource blocks (PRBs) of the PDSCH, one or more PRB groups (PRGs) of the PDSCH, one or more subbands of the PDSCH, or a wideband across all PRBs of the PDSCH.

Aspect 10: The method of any of Aspects 1-9, wherein each INC matrix of the one or more INC matrices includes a set of elements; and wherein transmitting the report indicating the one or more INC matrices comprises: transmitting, for an INC matrix of the one or more INC matrices, a subset of elements of the INC matrix from a set of elements of the INC matrix.

Aspect 11: The method of any of Aspects 1-10, wherein transmitting the report indicating the one or more INC matrices comprises: transmitting, to the network node, the report using uplink resources associated with acknowledgement or negative acknowledgement feedback associated with the PDSCH.

Aspect 12: The method of any of Aspects 1-11, wherein receiving the reporting configuration comprises: receiving, from the network node, an indication of uplink resources to be used to transmit the report; and wherein transmitting the report indicating the one or more INC matrices comprises: transmitting, to the network node, the report using the uplink resources.

Aspect 13: The method of Aspect 12, wherein the uplink resources include at least one of: uplink resources associated with acknowledgement or negative acknowledgement (ACK/NACK) feedback associated with the PDSCH, uplink resources that are separate from uplink resources associated with ACK/NACK feedback associated with the PDSCH, uplink resources associated with a physical uplink control channel, or uplink resources associated with a physical uplink shared channel.

Aspect 14: The method of any of Aspects 1-13, wherein transmitting the report indicating the one or more INC matrices comprises: transmitting, to the network node, the report and acknowledgement or negative acknowledgement feedback associated with the PDSCH in a two-stage uplink control information communication.

Aspect 15: The method of any of Aspects 1-14, wherein transmitting the report indicating the one or more INC matrices comprises: transmitting, to the network node, the report indicating: elements of an INC matrix of the one or more INC matrices, and elements of the remaining INC matrices, of the one or more INC matrices, as differential elements relative to corresponding elements of the INC matrix.

Aspect 16: The method of any of Aspects 1-15, wherein transmitting the report indicating the one or more INC matrices comprises: transmitting, to the network node, the report indicating an INC matrix, of the one or more INC matrices, that includes a set of elements, wherein the report indicates: a first subset of elements of the set of elements, and a second subset of elements, of the set of elements, as differential elements relative to corresponding elements of the first subset of elements.

Aspect 17: The method of Aspect 16, wherein the first subset of elements are quantized to a first quantization level and the second subset of elements are quantized to a second quantization level.

Aspect 18: The method of any of Aspects 1-17, wherein transmitting the report indicating the one or more INC matrices comprises: transmitting, to the network node, the report indicating an INC matrix, of the one or more INC matrices, that includes a set of elements quantized to a quantization level.

Aspect 19: The method of any of Aspects 1-18, wherein transmitting the report indicating the one or more INC matrices comprises: transmitting, to the network node, the report indicating: an INC matrix, of the one or more INC matrices, that includes a set of elements quantized to a first quantization level, and remaining INC matrices, of the one or more INC matrices, that each include a set of elements quantized to a second quantization level.

Aspect 20: The method of any of Aspects 1-19, wherein transmitting the report indicating the one or more INC matrices comprises: transmitting, to the network node, the report indicating: an INC matrix, of the one or more INC matrices, that includes a set of elements quantized to a first quantization level, and remaining INC matrices, of the one or more INC matrices, that each include a set of elements as differential elements relative to corresponding elements of the set of elements of the INC matrix, the differential elements quantized to a second quantization level.

Aspect 21: The method of any of Aspects 1-20, wherein transmitting the report indicating the one or more INC matrices comprises: transmitting, to the network node, the report indicating: an INC matrix, of the one or more INC matrices, that is a fully reported INC matrix, and remaining INC matrices, of the one or more INC matrices, that are partially reported INC matrices.

Aspect 22: The method of any of Aspects 1-21, wherein receiving the reporting configuration comprises: receiving, from the network node, downlink control information triggering the UE to transmit one or more reports indicating one or more INC matrices.

Aspect 23: The method of any of Aspects 1-22, wherein receiving the measurement configuration comprises: receiving, from the network node, an indication of a first number of instances in which an activated puncturing pattern associated with the PDSCH is to remain active; and wherein receiving the reporting configuration comprises: receiving an indication of a second number of instances, that is based at least in part on the first number of instances in which the activated puncturing pattern associated with the PDSCH is to remain active, that the UE is to transmit a report indicating the one or more INC matrices.

Aspect 24: The method of Aspect 23, wherein the one or more INC matrices are based at least in part on measurements performed using one or more punctured resources of the PDSCH indicated by the activated puncturing pattern.

Aspect 25: The method of any of Aspects 23-24, wherein receiving the indication of the second number of instances that the UE is to transmit the report indicating the one or more INC matrices comprises receiving the indication of the second number of instances via at least one of: a radio resource control (RRC) message, a medium access control (MAC) control element (MAC-CE) message, or a downlink control information (DCI) message.

Aspect 26: The method of any of Aspects 23-25, wherein receiving the indication of the second number of instances that the UE is to transmit the report indicating the one or more INC matrices comprises: receiving the indication of the second number of instances via a bitmap that includes a number of elements equal to the first number of instances in which the activated puncturing pattern associated with the PDSCH is to remain active.

Aspect 27: The method of any of Aspects 23-26, wherein the second number of instances is based at least in part on at least one of: a coherence time of an interference channel associated with the PDSCH, or an interference pattern associated with the PDSCH.

Aspect 28: The method of any of Aspects 23-27, wherein receiving the indication of the second number of instances that the UE is to transmit the report indicating the one or more INC matrices comprises: receiving an indication of one or more indices associated with one or more reporting locations, the one or more reporting locations indicating times at which the UE is to transmit a report indicating one or more INC matrices.

Aspect 29: The method of any of Aspects 1-28, wherein receiving the reporting configuration comprises: receiving an indication that the UE is to report one or more INC matrices that were estimated using measurements that are associated with: sounded antenna elements of the UE, unsounded antenna elements of the UE, or sounded antenna elements and unsounded antenna elements of the UE.

Aspect 30: The method of any of Aspects 1-30, wherein receiving the reporting configuration comprises: receiving an indication that the UE is to report one or more average INC matrices, an average INC matrix indicating a set of averaged elements across multiple INC matrices.

Aspect 31: The method of Aspect 30, wherein receiving the indication that the UE is to report the one or more average INC matrices comprises: receiving an indication of an amount of time or a number of PDSCH communications that is associated with an average INC matrix of the one or more average INC matrices.

Aspect 32: The method of any of Aspects 1-31, wherein a precoder to be used by the network node associated with the PDSCH is based at least in part on the one or more INC matrices at the UE.

Aspect 33: A method of wireless communication performed by a network node, comprising: Transmitting a measurement configuration intended for a user equipment (UE) indicating one or more punctured resources of a physical downlink shared channel (PDSCH) that can be used for measurements by the UE associated with estimating an interference plus noise covariance (INC) matrix at the UE; transmitting a reporting configuration intended for the UE indicating one or more INC matrices at the UE to be reported by the UE; and receiving a report associated with the UE indicating the one or more INC matrices at the UE based at least in part on transmitting the reporting configuration.

Aspect 34: The method of Aspect 33, further comprising: determining the measurement configuration; and determining the reporting configuration.

Aspect 35: The method of any of Aspects 33-34, wherein transmitting the measurement configuration comprises transmitting the measurement configuration in a downlink communication; and wherein transmitting the reporting configuration comprises transmitting the reporting configuration in the downlink communication.

Aspect 36: The method of any of Aspects 33-35, wherein transmitting the measurement configuration comprises transmitting the measurement configuration in a first downlink communication; and wherein transmitting the reporting configuration comprises transmitting the reporting configuration in a second downlink communication.

Aspect 37: The method of any of Aspects 33-36, wherein transmitting the measurement configuration comprises: transmitting an indication of one or more resource puncturing patterns associated with the PDSCH.

Aspect 38: The method of any of Aspects 33-37, wherein transmitting the measurement configuration comprises: transmitting downlink control information (DCI) activating one or more resource puncturing patterns associated with the PDSCH.

Aspect 39: The method of any of Aspects 33-38, wherein transmitting the measurement configuration comprises: transmitting an indication of an amount of time or a number of instances in which an activated puncturing pattern associated with the PDSCH is to remain active.

Aspect 40: The method of Aspect 39, wherein transmitting the indication of the amount of time or the number of instances in which the activated puncturing pattern associated with the PDSCH is to remain active comprises transmitting the indication via at least one of: a radio resource control (RRC) message, a medium access control (MAC) control element (MAC-CE) message, or a downlink control information (DCI) message.

Aspect 41: The method of any of Aspects 33-40, wherein transmitting the reporting configuration comprises: transmitting an indication that the UE is to report INC matrices for at least one of: one or more physical resource blocks (PRBs) of the PDSCH, one or more PRB groups (PRGs) of the PDSCH, one or more subbands of the PDSCH, or a wideband across all PRBs of the PDSCH.

Aspect 42: The method of any of Aspects 33-41, wherein each INC matrix of the one or more INC matrices includes a set of elements; and wherein receiving the report indicating the one or more INC matrices comprises: receiving, for an INC matrix of the one or more INC matrices, a subset of elements of the INC matrix from a set of elements of the INC matrix.

Aspect 43: The method of any of Aspects 33-42, wherein receiving the report indicating the one or more INC matrices comprises: receiving the report using uplink resources associated with acknowledgement or negative acknowledgement feedback associated with the PDSCH.

Aspect 44: The method of any of Aspects 33-43, wherein transmitting the reporting configuration comprises: transmitting an indication of uplink resources to be used to transmit the report; and wherein receiving the report indicating the one or more INC matrices comprises: receiving, from the UE, the report using the uplink resources.

Aspect 45: The method of Aspect 44, wherein the uplink resources include at least one of: uplink resources associated with acknowledgement or negative acknowledgement (ACK/NACK) feedback associated with the PDSCH, uplink resources that are separate from uplink resources associated with ACK/NACK feedback associated with the PDSCH, uplink resources associated with a physical uplink control channel, or uplink resources associated with a physical uplink shared channel.

Aspect 46: The method of any of Aspects 33-45, wherein receiving the report indicating the one or more INC matrices comprises: receiving the report and acknowledgement or negative acknowledgement feedback associated with the PDSCH in a two-stage uplink control information communication.

Aspect 47: The method of any of Aspects 33-46, wherein receiving the report indicating the one or more INC matrices comprises: receiving the report indicating: elements of an INC matrix of the one or more INC matrices, and elements of the remaining INC matrices, of the one or more INC matrices, as differential elements relative to corresponding elements of the INC matrix.

Aspect 48: The method of any of Aspects 33-47, wherein receiving the report indicating the one or more INC matrices comprises: receiving the report indicating an INC matrix, of the one or more INC matrices, that includes a set of elements, wherein the report indicates: a first subset of elements of the set of elements, and a second subset of elements, of the set of elements, as differential elements relative to corresponding elements of the first subset of elements.

Aspect 49: The method of Aspect 48, wherein the first subset of elements are quantized to a first quantization level and the second subset of elements are quantized to a second quantization level.

Aspect 50: The method of any of Aspects 33-49, wherein receiving the report indicating the one or more INC matrices comprises: receiving the report indicating an INC matrix, of the one or more INC matrices, that includes a set of elements quantized to a quantization level.

Aspect 51: The method of any of Aspects 33-50, wherein receiving the report indicating the one or more INC matrices comprises: receiving the report indicating: an INC matrix, of the one or more INC matrices, that includes a set of elements quantized to a first quantization level, and remaining INC matrices, of the one or more INC matrices, that each include a set of elements quantized to a second quantization level.

Aspect 52: The method of any of Aspects 33-51, wherein receiving the report indicating the one or more INC matrices comprises: receiving the report indicating: an INC matrix, of the one or more INC matrices, that includes a set of elements quantized to a first quantization level, and remaining INC matrices, of the one or more INC matrices, that each include a set of elements as differential elements relative to corresponding elements of the set of elements of the INC matrix, the differential elements quantized to a second quantization level.

Aspect 53: The method of any of Aspects 33-52, wherein receiving the report indicating the one or more INC matrices comprises: receiving the report indicating: an INC matrix, of the one or more INC matrices, that is a fully reported INC matrix, and remaining INC matrices, of the one or more INC matrices, that are partially reported INC matrices.

Aspect 54: The method of any of Aspects 33-53, wherein transmitting the reporting configuration comprises: transmitting downlink control information triggering the UE to transmit one or more reports indicating one or more INC matrices.

Aspect 55: The method of any of Aspects 33-54, wherein transmitting the measurement configuration comprises: transmitting an indication of a first number of instances in which an activated puncturing pattern associated with the PDSCH is to remain active; and wherein transmitting the reporting configuration comprises: transmitting an indication of a second number of instances, that is based at least in part on the first number of instances in which the activated puncturing pattern associated with the PDSCH is to remain active, that the UE is to transmit a report indicating the one or more INC matrices.

Aspect 56: The method of Aspect 55, wherein the one or more INC matrices are based at least in part on measurements performed by the UE using one or more punctured resources of the PDSCH indicated by the activated puncturing pattern.

Aspect 57: The method of any of Aspects 55-56, wherein transmitting the indication of the second number of instances that the UE is to transmit the report indicating the one or more INC matrices comprises transmitting the indication of the second number of instances via at least one of: a radio resource control (RRC) message, a medium access control (MAC) control element (MAC-CE) message, or a downlink control information (DCI) message.

Aspect 58: The method of any of Aspects 55-57, wherein transmitting the indication of the second number of instances that the UE is to transmit the report indicating the one or more INC matrices comprises: transmitting the indication of the second number of instances via a bitmap that includes a number of elements equal to the first number of instances in which the activated puncturing pattern associated with the PDSCH is to remain active.

Aspect 59: The method of any of Aspects 55-58, further comprising: determining the second number of instances based at least in part on at least one of: a coherence time of an interference channel associated with the PDSCH, or an interference pattern associated with the PDSCH.

Aspect 60: The method of any of Aspects 55-59, wherein transmitting the indication of the second number of instances that the UE is to transmit the report indicating the one or more INC matrices comprises: transmitting an indication of one or more indices associated with one or more reporting locations, the one or more reporting locations indicating times at which the UE is to transmit a report indicating one or more INC matrices.

Aspect 61: The method of any of Aspects 33-60, wherein transmitting the reporting configuration comprises: transmitting an indication that the UE is to report one or more INC matrices that were estimated by the UE using measurements that are associated with: sounded antenna elements of the UE, unsounded antenna elements of the UE, or sounded antenna elements and unsounded antenna elements of the UE.

Aspect 62: The method of any of Aspects 33-61, wherein transmitting the reporting configuration comprises: transmitting an indication that the UE is to report one or more average INC matrices, an average INC matrix indicating a set of averaged elements across multiple INC matrices.

Aspect 63: The method of Aspect 62, wherein transmitting the indication that the UE is to report the one or more average INC matrices comprises: transmitting an indication of an amount of time or a number of PDSCH communications that is associated with an average INC matrix of the one or more average INC matrices.

Aspect 64: The method of any of Aspects 33-63, further comprising: determining a precoder to be used by the network node associated with the PDSCH based at least in part on the one or more INC matrices at the UE.

Aspect 65: An apparatus for wireless communication at a device, comprising a processor; memory coupled with the processor; and instructions stored in the memory and executable by the processor to cause the apparatus to perform the method of one or more of Aspects 1-32.

Aspect 66: A device for wireless communication, comprising a memory and one or more processors coupled to the memory, the one or more processors configured to perform the method of one or more of Aspects 1-32.

Aspect 67: An apparatus for wireless communication, comprising at least one means for performing the method of one or more of Aspects 1-32.

Aspect 68: A non-transitory computer-readable medium storing code for wireless communication, the code comprising instructions executable by a processor to perform the method of one or more of Aspects 1-32.

Aspect 69: A non-transitory computer-readable medium storing a set of instructions for wireless communication, the set of instructions comprising one or more instructions that, when executed by one or more processors of a device, cause the device to perform the method of one or more of Aspects 1-32.

Aspect 70: An apparatus for wireless communication at a device, comprising a processor; memory coupled with the processor; and instructions stored in the memory and executable by the processor to cause the apparatus to perform the method of one or more of Aspects 33-64.

Aspect 71: A device for wireless communication, comprising a memory and one or more processors coupled to the memory, the one or more processors configured to perform the method of one or more of Aspects 33-64.

Aspect 72: An apparatus for wireless communication, comprising at least one means for performing the method of one or more of Aspects 33-64.

Aspect 73: A non-transitory computer-readable medium storing code for wireless communication, the code comprising instructions executable by a processor to perform the method of one or more of Aspects 33-64.

Aspect 74: A non-transitory computer-readable medium storing a set of instructions for wireless communication, the set of instructions comprising one or more instructions that, when executed by one or more processors of a device, cause the device to perform the method of one or more of Aspects 33-64.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive, from a network node, a measurement configuration indicating one or more punctured resources of a physical downlink shared channel (PDSCH) that can be used for measurements associated with estimating an interference plus noise covariance (INC) matrix at the UE;
      receive, from the network node, a reporting configuration indicating one or more INC matrices at the UE to be reported; and
      transmit, to the network node, a report indicating the one or more INC matrices at the UE based at least in part on receiving the reporting configuration.

2. The UE of claim 1, wherein the one or more processors are further configured to:
   measure the PDSCH using the one or more punctured resources to estimate the one or more INC matrices at the UE.

3. The UE of claim 1, wherein the one or more processors, to receive the measurement configuration, are configured to receive the measurement configuration in a downlink communication; and
   wherein the one or more processors, to receive the reporting configuration, are configured to receive the reporting configuration in the downlink communication.

4. The UE of claim 1, wherein the one or more processors, to receive the measurement configuration, are configured to:
   receive, from the network node, an indication of one or more resource puncturing patterns associated with the PDSCH.

5. The UE of claim 1, wherein the one or more processors, to receive the measurement configuration, are configured to:
   receive, from the network node, an indication of an amount of time or a number of instances in which an activated puncturing pattern associated with the PDSCH is to remain active.

6. The UE of claim 1, wherein each INC matrix of the one or more INC matrices includes a set of elements; and
   wherein the one or more processors, to transmit the report indicating the one or more INC matrices, are configured to:
      transmit, for an INC matrix of the one or more INC matrices, a subset of elements of the INC matrix from a set of elements of the INC matrix.

7. The UE of claim 1, wherein the one or more processors, to transmit the report indicating the one or more INC matrices, are configured to:
   transmit, to the network node, the report using uplink resources associated with acknowledgement or negative acknowledgement feedback associated with the PDSCH.

8. The UE of claim 1, wherein the one or more processors, to receive the reporting configuration, are configured to:
   receive, from the network node, an indication of uplink resources to be used to transmit the report; and
   wherein the one or more processors, to transmit the report indicating the one or more INC matrices, are configured to:
      transmit, to the network node, the report using the uplink resources.

9. The UE of claim 1, wherein the one or more processors, to transmit the report indicating the one or more INC matrices, are configured to:
   transmit, to the network node, the report and acknowledgement or negative acknowledgement feedback associated with the PDSCH in a two-stage uplink control information communication.

10. The UE of claim 1, wherein the one or more processors, to transmit the report indicating the one or more INC matrices, are configured to:
transmit, to the network node, the report indicating:
elements of an INC matrix of the one or more INC matrices, and
elements of the remaining INC matrices, of the one or more INC matrices, as differential elements relative to corresponding elements of the INC matrix.

11. The UE of claim 1, wherein the one or more processors, to receive the measurement configuration, are configured to:
receive, from the network node, an indication of a first quantity of instances in which an activated puncturing pattern associated with the PDSCH is to remain active; and
wherein the one or more processors, to receive the reporting configuration, are configured to:
receive an indication of a second quantity of instances, that is based at least in part on the first quantity of instances in which the activated puncturing pattern associated with the PDSCH is to remain active, in which the UE is to transmit a report indicating the one or more INC matrices.

12. The UE of claim 1, wherein the one or more processors, to receive the reporting configuration, are configured to:
receive an indication that the UE is to report one or more INC matrices that were estimated using measurements that are associated with:
sounded antenna elements of the UE,
unsounded antenna elements of the UE, or
sounded antenna elements and unsounded antenna elements of the UE.

13. The UE of claim 1, wherein the one or more processors, to receive the reporting configuration, are configured to:
receive an indication that the UE is to report one or more average INC matrices, an average INC matrix indicating a set of averaged elements across multiple INC matrices.

14. A network node for wireless communication, comprising:
a memory; and
one or more processors, coupled to the memory, configured to:
transmit a measurement configuration intended for a user equipment (UE) indicating one or more punctured resources of a physical downlink shared channel (PDSCH) that can be used for measurements by the UE associated with estimating an interference plus noise covariance (INC) matrix at the UE;
transmit a reporting configuration intended for the UE indicating one or more INC matrices at the UE to be reported by the UE; and
receive a report associated with the UE indicating the one or more INC matrices at the UE based at least in part on transmitting the reporting configuration.

15. The network node of claim 14, wherein the one or more processors, to transmit the measurement configuration, are configured to:
transmit downlink control information (DCI) activating one or more resource puncturing patterns associated with the PDSCH.

16. A method of wireless communication performed by a user equipment (UE), comprising:
receiving, from a network node, a measurement configuration indicating one or more punctured resources of a physical downlink shared channel (PDSCH) that can be used for measurements associated with estimating an interference plus noise covariance (INC) matrix at the UE;
receiving, from the network node, a reporting configuration indicating one or more INC matrices at the UE to be reported; and
transmitting, to the network node, a report indicating the one or more INC matrices at the UE based at least in part on receiving the reporting configuration.

17. The method of claim 16, further comprising:
measuring the PDSCH using the one or more punctured resources to estimate the one or more INC matrices at the UE.

18. The method of claim 16, wherein receiving the measurement configuration comprises receiving the measurement configuration in a first downlink communication; and
wherein receiving the reporting configuration comprises receiving the reporting configuration in a second downlink communication.

19. The method of claim 16, wherein receiving the measurement configuration comprises:
receiving, from the network node, downlink control information (DCI) activating one or more resource puncturing patterns associated with the PDSCH.

20. The method of claim 16, wherein receiving the measurement configuration comprises:
receiving, from the network node, an indication of an amount of time or a quantity of instances in which an activated puncturing pattern associated with the PDSCH is to remain active.

21. The method of claim 16, wherein receiving the reporting configuration comprises:
receiving, from the network node, an indication that the UE is to report INC matrices for at least one of:
one or more physical resource blocks (PRBs) of the PDSCH,
one or more PRB groups (PRGs) of the PDSCH,
one or more subbands of the PDSCH, or
a wideband across all PRBs of the PDSCH.

22. The method of claim 16, wherein transmitting the report indicating the one or more INC matrices comprises:
transmitting, to the network node, the report using uplink resources associated with acknowledgement or negative acknowledgement feedback associated with the PDSCH.

23. The method of claim 16, wherein transmitting the report indicating the one or more INC matrices comprises:
transmitting, to the network node, the report and acknowledgement or negative acknowledgement feedback associated with the PDSCH in a two-stage uplink control information communication.

24. The method of claim 16, wherein transmitting the report indicating the one or more INC matrices comprises:
transmitting, to the network node, the report indicating:
elements of an INC matrix of the one or more INC matrices, and elements of the remaining INC matrices, of the one or more INC matrices, as differential elements relative to corresponding elements of the INC matrix.

25. The method of claim 16, wherein receiving the measurement configuration comprises:

receiving, from the network node, an indication of a first quantity of instances in which an activated puncturing pattern associated with the PDSCH is to remain active; and wherein receiving the reporting configuration comprises:
receiving an indication of a second quantity of instances, that is based at least in part on the first quantity of instances in which the activated puncturing pattern associated with the PDSCH is to remain active, that the UE is to transmit a report indicating the one or more INC matrices.

26. The method of claim 25, wherein the second quantity of instances is based at least in part on at least one of:
a coherence time of an interference channel associated with the PDSCH, or an interference pattern associated with the PDSCH.

27. A method of wireless communication performed by a network node, comprising:
transmitting a measurement configuration intended for a user equipment (UE) indicating one or more punctured resources of a physical downlink shared channel (PDSCH) that can be used for measurements by the UE associated with estimating an interference plus noise covariance (INC) matrix at the UE;
transmitting a reporting configuration intended for the UE indicating one or more INC matrices at the UE to be reported by the UE; and
receiving a report associated with the UE indicating the one or more INC matrices at the UE based at least in part on transmitting the reporting configuration.

28. The method of claim 27, wherein transmitting the measurement configuration comprises:
transmitting an indication of one or more resource puncturing patterns associated with the PDSCH.

29. The method of claim 27, wherein transmitting the measurement configuration comprises:
transmitting an indication of an amount of time or a quantity of instances in which an activated puncturing pattern associated with the PDSCH is to remain active.

30. The method of claim 27, wherein each INC matrix of the one or more INC matrices includes a set of elements; and
wherein receiving the report indicating the one or more INC matrices comprises:
receiving, for an INC matrix of the one or more INC matrices, a subset of elements of the INC matrix from a set of elements of the INC matrix.

* * * * *